(12) United States Patent
Monaco et al.

(10) Patent No.: US 9,838,345 B2
(45) Date of Patent: Dec. 5, 2017

(54) GENERATING A RELATIONSHIP HISTORY

(71) Applicant: YAHOO HOLDINGS, INC., Sunnyvale, CA (US)

(72) Inventors: Peter Monaco, Los Altos, CA (US); Angel Steger, San Francisco, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 0 days.

(21) Appl. No.: 14/936,146

(22) Filed: Nov. 9, 2015

(65) Prior Publication Data
US 2016/0099900 A1 Apr. 7, 2016

Related U.S. Application Data

(63) Continuation of application No. 13/324,480, filed on Dec. 13, 2011, now Pat. No. 9,183,544.

(60) Provisional application No. 61/423,054, filed on Dec. 14, 2010.

(51) Int. Cl.
| | | |
|---|---|---|
| G06F 15/16 | (2006.01) | |
| H04L 12/58 | (2006.01) | |
| G06Q 10/10 | (2012.01) | |
| H04L 29/08 | (2006.01) | |

(52) U.S. Cl.
CPC ........... *H04L 51/16* (2013.01); *G06Q 10/107* (2013.01); *H04L 51/043* (2013.01); *H04L 67/306* (2013.01)

(58) Field of Classification Search
CPC ..... H04L 51/16; H04L 67/306; H04L 51/043; G06Q 10/107
See application file for complete search history.

(56) References Cited

U.S. PATENT DOCUMENTS

| | | |
|---|---|---|
| 6,529,728 B1 | 3/2003 | Pfeffer et al. |
| 6,615,241 B1 | 9/2003 | Miller et al. |
| 6,615,348 B1 | 9/2003 | Gibbs |
| 6,832,245 B1 | 12/2004 | Isaacs et al. |
| 6,952,805 B1 | 10/2005 | Tafoya et al. |
| 6,996,777 B2 | 2/2006 | Hiipakka |

(Continued)

FOREIGN PATENT DOCUMENTS

| | | |
|---|---|---|
| JP | 2003006116 | 1/2003 |
| JP | 2007249307 | 9/2007 |

(Continued)

OTHER PUBLICATIONS

International Patent Application PCT/US10/52081, International Search Report and Written Opinion, dated May 20, 2011.

(Continued)

*Primary Examiner* — John B Walsh
(74) *Attorney, Agent, or Firm* — James J. DeCarlo; Greenberg Traurig, LLP

(57) ABSTRACT

Systems and methods for generation of a relationship history or text for a new message. In one embodiment, a method includes: scanning, by a computing device, a set of messages to or from a user to generate a plurality of profiles for persons associated with the messages, each person being a sender or a recipient of at least one of the set of messages, and the persons including a first person; generating, via the computer, a relationship history using the plurality of profiles, wherein the relationship history is for a relationship between the user and the first person; and presenting the relationship history to the user.

14 Claims, 9 Drawing Sheets

(56) References Cited

U.S. PATENT DOCUMENTS

| | | |
|---|---|---|
| 7,099,853 B1 | 8/2006 | Liu et al. |
| 7,228,335 B2 | 6/2007 | Caughey |
| 7,359,894 B1 | 4/2008 | Liebman et al. |
| 7,454,470 B1 | 11/2008 | Isaacs et al. |
| 7,475,113 B2 | 1/2009 | Stolze |
| 7,512,788 B2 | 3/2009 | Choi et al. |
| 7,536,384 B2 | 5/2009 | Venkataraman et al. |
| 7,539,676 B2 | 5/2009 | Aravamudan et al. |
| 7,580,363 B2 | 8/2009 | Sorvari et al. |
| 7,610,341 B2 | 10/2009 | Daniell |
| 7,610,342 B1 | 10/2009 | Pettigrew et al. |
| 7,685,144 B1 | 3/2010 | Katragadda |
| 7,725,492 B2 | 5/2010 | Sittig et al. |
| 7,743,051 B1 | 6/2010 | Kashyap et al. |
| 7,756,895 B1 | 7/2010 | Emigh |
| 7,788,260 B2 | 8/2010 | Lunt et al. |
| 7,805,492 B1 | 9/2010 | Thatcher et al. |
| 7,827,208 B2 | 11/2010 | Bosworth et al. |
| 7,827,265 B2 | 11/2010 | Cheever et al. |
| 7,836,134 B2 | 11/2010 | Pantalone |
| 7,853,602 B2 | 12/2010 | Gorti et al. |
| 7,865,562 B2 | 1/2011 | Nesbitt et al. |
| 7,870,204 B2 | 1/2011 | LeVasseur et al. |
| 7,899,806 B2 | 3/2011 | Aravamudan et al. |
| 7,930,430 B2 | 4/2011 | Thatcher et al. |
| 7,949,627 B2 | 5/2011 | Aravamudan et al. |
| 8,086,676 B2 | 12/2011 | Palahnuk et al. |
| 8,086,968 B2 | 12/2011 | McCaffrey et al. |
| 8,145,791 B2 | 3/2012 | Thatcher et al. |
| 8,170,189 B2 | 5/2012 | Alperin et al. |
| 8,359,359 B2 | 1/2013 | Tada |
| 8,407,311 B1 * | 3/2013 | Behforooz ............ G06Q 10/107 709/217 |
| 8,468,168 B2 | 6/2013 | Brezina et al. |
| 8,572,191 B2 | 10/2013 | Bonforte |
| 8,799,387 B2 | 8/2014 | Alspector et al. |
| 9,021,028 B2 | 4/2015 | Smith et al. |
| 9,087,323 B2 | 7/2015 | Hein et al. |
| 9,152,952 B2 | 10/2015 | Smith et al. |
| 9,160,689 B2 | 10/2015 | Bonforte |
| 9,160,690 B2 | 10/2015 | Bonforte |
| 9,183,544 B2 | 11/2015 | Monaco et al. |
| 9,275,126 B2 * | 3/2016 | Smith .................. G06Q 10/107 |
| 9,699,129 B1 | 7/2017 | Nelken et al. |
| 2002/0049751 A1 | 4/2002 | Chen et al. |
| 2002/0059402 A1 | 5/2002 | Belanger |
| 2002/0087647 A1 | 7/2002 | Quine et al. |
| 2002/0103873 A1 | 8/2002 | Ramanathan et al. |
| 2002/0103879 A1 | 8/2002 | Mondragon |
| 2002/0116396 A1 | 8/2002 | Somers et al. |
| 2003/0028525 A1 | 2/2003 | Santos et al. |
| 2003/0114956 A1 | 6/2003 | Cullen et al. |
| 2003/0187937 A1 | 10/2003 | Yao et al. |
| 2004/0034537 A1 | 2/2004 | Gengarella et al. |
| 2004/0143635 A1 | 7/2004 | Galea |
| 2004/0167964 A1 | 8/2004 | Rounthwaite et al. |
| 2004/0205002 A1 | 10/2004 | Layton |
| 2004/0215726 A1 | 10/2004 | Arning et al. |
| 2004/0236838 A1 | 11/2004 | Tout |
| 2004/0267893 A1 | 12/2004 | Lin |
| 2004/0268229 A1 | 12/2004 | Paoli et al. |
| 2005/0041789 A1 | 2/2005 | Warren-Smith et al. |
| 2005/0055409 A1 | 3/2005 | Alsarraf et al. |
| 2005/0131888 A1 | 6/2005 | Tafoya et al. |
| 2005/0159970 A1 | 7/2005 | Buyukkokten et al. |
| 2005/0166160 A1 | 7/2005 | Bergstrom et al. |
| 2005/0203929 A1 | 9/2005 | Hazarika et al. |
| 2005/0262208 A1 | 11/2005 | Haviv et al. |
| 2006/0004892 A1 | 1/2006 | Lunt et al. |
| 2006/0020398 A1 | 1/2006 | Vernon et al. |
| 2006/0031306 A1 | 2/2006 | Haverkos |
| 2006/0031483 A1 | 2/2006 | Lund et al. |
| 2006/0056015 A1 | 3/2006 | Nishiyama |
| 2006/0123357 A1 | 6/2006 | Okamura |
| 2006/0168024 A1 | 7/2006 | Mehr et al. |
| 2006/0195474 A1 | 8/2006 | Cadiz et al. |
| 2006/0203811 A1 | 9/2006 | Aoki et al. |
| 2006/0235934 A1 | 10/2006 | Wilson et al. |
| 2007/0022447 A1 | 1/2007 | Arseneau et al. |
| 2007/0050455 A1 | 3/2007 | Yach et al. |
| 2007/0123222 A1 | 5/2007 | Cox et al. |
| 2007/0214141 A1 | 9/2007 | Sittig et al. |
| 2007/0250585 A1 | 10/2007 | Ly et al. |
| 2007/0288578 A1 | 12/2007 | Pantalone |
| 2008/0031228 A1 | 2/2008 | Gallant |
| 2008/0040370 A1 | 2/2008 | Bosworth et al. |
| 2008/0040435 A1 | 2/2008 | Buschi et al. |
| 2008/0040474 A1 | 2/2008 | Zuckerberg et al. |
| 2008/0040475 A1 | 2/2008 | Bosworth et al. |
| 2008/0147639 A1 | 6/2008 | Hartman et al. |
| 2008/0162347 A1 | 7/2008 | Wagner |
| 2008/0208812 A1 | 8/2008 | Quoc et al. |
| 2008/0242277 A1 | 10/2008 | Chen et al. |
| 2008/0270038 A1 | 10/2008 | Partovi et al. |
| 2008/0275748 A1 | 11/2008 | John |
| 2008/0299960 A1 | 12/2008 | Lockhart et al. |
| 2008/0307066 A1 | 12/2008 | Amidon et al. |
| 2008/0319943 A1 | 12/2008 | Fischer |
| 2009/0005076 A1 | 1/2009 | Forstall et al. |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0070412 A1 | 3/2009 | D'Angelo et al. |
| 2009/0077026 A1 | 3/2009 | Yanagihara |
| 2009/0106415 A1 | 4/2009 | Brezina et al. |
| 2009/0106676 A1 | 4/2009 | Brezina et al. |
| 2009/0119678 A1 | 5/2009 | Shih et al. |
| 2009/0132395 A1 | 5/2009 | Lam et al. |
| 2009/0157717 A1 | 6/2009 | Palahnuk et al. |
| 2009/0171930 A1 | 7/2009 | Vaughan et al. |
| 2009/0177754 A1 | 7/2009 | Brezina et al. |
| 2009/0182788 A1 | 7/2009 | Chung et al. |
| 2009/0191899 A1 | 7/2009 | Wilson et al. |
| 2009/0198688 A1 | 8/2009 | Venkataraman et al. |
| 2009/0228555 A1 | 9/2009 | Joviak et al. |
| 2009/0234925 A1 | 9/2009 | Seippel, III et al. |
| 2009/0249198 A1 | 10/2009 | Davis et al. |
| 2009/0254858 A1 | 10/2009 | McCaffrey et al. |
| 2009/0267728 A1 | 10/2009 | Mayrand |
| 2009/0292776 A1 | 11/2009 | Nesbitt et al. |
| 2009/0306981 A1 | 12/2009 | Cromack et al. |
| 2010/0015976 A1 | 1/2010 | Issa et al. |
| 2010/0017476 A1 | 1/2010 | Shue |
| 2010/0030715 A1 | 2/2010 | Eustice et al. |
| 2010/0049534 A1 | 2/2010 | Whitnah et al. |
| 2010/0062753 A1 | 3/2010 | Wen et al. |
| 2010/0083149 A1 | 4/2010 | McCaffrey et al. |
| 2010/0094869 A1 | 4/2010 | Ebanks |
| 2010/0131447 A1 | 5/2010 | Creutz et al. |
| 2010/0164957 A1 | 7/2010 | Lindsay et al. |
| 2010/0169327 A1 | 7/2010 | Lindsay et al. |
| 2010/0185610 A1 | 7/2010 | Lunt et al. |
| 2010/0191844 A1 | 7/2010 | He et al. |
| 2010/0229223 A1 | 9/2010 | Shepard et al. |
| 2010/0241579 A1 | 9/2010 | Bassett et al. |
| 2010/0248681 A1 | 9/2010 | Phills |
| 2010/0306185 A1 | 12/2010 | Smith et al. |
| 2010/0312837 A1 | 12/2010 | Bodapati et al. |
| 2011/0010423 A1 | 1/2011 | Thatcher et al. |
| 2011/0029620 A1 | 2/2011 | Bonforte |
| 2011/0035451 A1 | 2/2011 | Smith et al. |
| 2011/0087969 A1 | 4/2011 | Hein et al. |
| 2011/0191717 A1 | 8/2011 | Cort et al. |
| 2011/0219317 A1 | 9/2011 | Thatcher et al. |
| 2012/0089678 A1 | 4/2012 | Cort et al. |
| 2012/0089690 A1 | 4/2012 | Hein et al. |
| 2012/0110080 A1 | 5/2012 | Panyam et al. |
| 2012/0131107 A1 | 5/2012 | Yost |
| 2012/0150978 A1 | 6/2012 | Monaco et al. |

(56) References Cited

U.S. PATENT DOCUMENTS

| | | | |
|---|---|---|---|
| 2012/0150979 | A1 | 6/2012 | Monaco |
| 2012/0166999 | A1 | 6/2012 | Thatcher et al. |
| 2012/0215861 | A1 | 8/2012 | Smith et al. |
| 2014/0052803 | A1 | 2/2014 | Bonforte |
| 2014/0052804 | A1 | 2/2014 | Bonforte |
| 2015/0229595 | A1 | 8/2015 | Smith et al. |
| 2016/0028674 | A1 | 1/2016 | Smith et al. |

FOREIGN PATENT DOCUMENTS

| | | |
|---|---|---|
| KR | 20060056015 | 5/2006 |
| KR | 1020090068819 | 6/2009 |
| KR | 1020090112257 | 10/2009 |
| KR | 1020090115239 | 11/2009 |
| KR | 1020020060386 | 8/2012 |
| WO | 2007143232 | 12/2007 |
| WO | 2012082929 | 6/2012 |

OTHER PUBLICATIONS

International Patent Application PCT/US11/64958, International Search Report and Written Opinion, dated Jul. 31, 2012.
Android-Tips.com, "Android Tips & Tricks: How to Import Contacts into Android Phone," located at http://android-tips. com/how-to-import-contacts-into-android/, Nov. 17, 2008 (document provided includes third-party comments submitted under the USPTO PeerToPatent program).
Bernstein, Michael S. et al., "Enhancing Directed Content Sharing on the Web," Proceedings of the 28th International Conference on Human Factors in Computing Systems, Atlanta, GA; Apr. 10-15, 2010, pp. 971-980.
Carvalho, Vitor R, et al., "Ranking Users for Intelligent Message Addressing," Proceedings of the 30th European Conference on Information Retrieval, Glasgow, England, Mar. 30-Apr. 3, 2008, pp. 321-333.
Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).
Elsayed, Tamer et al., "Personal Name Resolution in Email: A Heuristic Approach," University of Maryland Technical Report No. TR-LAMP-150, Mar. 17, 2008.
European Patent Application No. 11848233.0, Extended Search Report, dated Mar. 27, 2014.
European Patent Application No. 11848233.0, Search Report, dated Dec. 10, 2014.
Fitzpatrick, Brad, "AddressBooker," Github Social Coding, located at http://addressbooker.appspot.com/, Nov. 28, 2008 (document provided includes third-party comments submitted under the USPTO PeerToPatent program).
Google Inc. "OpenSocial Tutorial," located at http://code.google.com/apis/opensocial/articles/tutorial/tutorial-0.8 html, Aug. 2008.
Google Inc., "Automatic Updating of Contacts," Gmail help forum, located at http://74.125.4.16/support/forum/p/gmail/thread?id=03f7b692150d9242&hl=en, Apr. 27, 2009 (document provided includes third-party comments submitted under the USPTO PeerToPatent program).
Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).
International Patent Application PCT/US10/34782, International Search Report and Written Opinion, dated Dec. 22, 2010.
International Patent Application PCT/US10/35405, International Search Report and Written Opinion, dated Jan. 3, 2011.
International Patent Application PCT/US12/043523, International Search Report and Written Opinion, dated Nov. 26, 2012.
International Patent Application PCT/US2011/064892, International Search Report and Written Opinion, dated Aug. 22, 2012.
Levine, Josh, "Known Sender Finder," Jan. 1, 2006, available at http://josh.com/KnownSender/.
Mertz, David "Spam Filtering Techniques, Six approaches to eliminating unwanted email," developerWorks, Sep. 12, 2002, available at http://www.ibm.com/developerworks/linux/library/I-spamf/index.html.
OpenSocial Foundation, "Social Application Tutorial (v0.9)," located at http://wiki.opensocial.org/index.php?title=Social_Application_Tutorial, accessed Oct. 8, 2010.
PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).
U.S. Appl. No. 61/407,018, filed Oct. 27, 2010.
Sahami, Mehran et al., "A Bayesian Approach to Filtering Junk E-Mail," AAAI Workshop on Learning for Text Categorization, Jul. 1998, Madison, Wisconsin, AAAI Technical Report WS-98-05.
Taylor, Bradley, "Sender Reputation in a Large Webmail Service," Google, CEAS 2006—Third Conference on Email and Anti-Spam, Jul. 27-28, 2006, 6 pgs.
European Patent Application No. 10797483.4, extended European Search Report, dated Dec. 20, 2016.

* cited by examiner

GENERATING A RELATIONSHIP HISTORY

CROSS-REFERENCE TO RELATED APPLICATIONS

This application is a continuation of and claims the benefit of U.S. Pat. No. 9,183,544 filed Dec. 13, 2011, which claims the benefit of Prov. U.S. Pat. App. Ser. No. 61/423,054, filed Dec. 14, 2010, entitled "GENERATING A RELATIONSHIP HISTORY," by Monaco et al., which documents are hereby incorporated by reference herein in their entirety.

This application is related to U.S. Non-Provisional application Ser. No. 12/579,321, filed Oct. 14, 2009, entitled "SYSTEMS AND METHODS TO AUTOMATICALLY GENERATE A SIGNATURE BLOCK," by Hein et al., the entire contents of which are incorporated by reference as if fully set forth herein.

This application is also related to U.S. Non-Provisional application Ser. No. 12/792,698, filed Jun. 2, 2010, entitled "SELF POPULATING ADDRESS BOOK," by Smith et al., the entire contents of which are incorporated by reference as if fully set forth herein.

FIELD OF THE TECHNOLOGY

At least some embodiments of the disclosure relate to user interfaces in general and, more particularly but not limited to, generating a relationship history for presentation to a user.

BACKGROUND

Many systems and applications have been developed to allow people to communicate with each other. Such systems and applications may provide communication via emails, instant messages, text messages, web/online postings, etc.

Email systems typically use servers to receive the electronic messages from the senders, to store and/or forward the messages on behalf of the senders, and to deliver the messages to the recipients. Since the servers can store the messages for a period of time before delivery, a recipient and a sender do not have to establish a direct communication connection to facilitate the transmission of the electronic message. Thus, the sender and the recipient do not have to be online simultaneously for email communications.

In an email system, an email client application is typically used to receive and display messages and to compose and send messages. The email client application communicates with one or more email servers to receive and send messages. Email addresses are used to identify the recipients of the messages.

An email client application may be a stand-alone application running on a user terminal (e.g., a personal desktop or portable computer, a personal digital assistant (PDA), or a smart phone). The email client application stores messages received from one or more email servers, and can display the stored messages to a user even when the user terminal is not connected to the network.

An email client application may also be implemented in part via a server. The server stores the messages on behalf of a user, and when requested, formats a message as a web page for display on a browser used by the user.

Instant messaging (IM) allows real-time communication between people. A communication connection between the devices of the participants in an instant messaging session is required for the delivery of the instant messages sent during the session. User names are typically used to identify the online presence and thus the online addresses (e.g., Internet Protocol (IP) addresses) of the users, which are used to establish the communication connections for the instant messaging session. Therefore, the user names of instant messaging systems can be considered as the addresses for establishing online connections for instant messaging sessions, from the point of view of the users.

Text messaging allows users to communicate via mobile phones over cellular communications network. Text messages are typically transmitted via Short Message Service (SMS) or Multimedia Messaging Service (MMS). The phone numbers of the mobile phones are used as the address of the recipients of the text messages.

Some user terminals (e.g., personal computers, PDA, mobile phones) may support communications in multiple modes, such as email, instant messages, and text messages.

Some applications have been developed to organize address and other types of information for users. For example, an address application may store information about a plurality of persons. For each of the persons, the address application may store the name of the person, the email address of the person, the street address of the person, the IM address of the person, the web page address of the person, phone numbers of the person, etc.

SUMMARY OF THE DESCRIPTION

Systems and methods are described herein, including systems and methods to automatically generate text for a new message, or to generate a relationship history for presentation to a user (or other use by a computer system) in an automated way. Some embodiments are summarized in this section.

In one embodiment, a method implemented in a computer includes: scanning, by a computer, a set of messages to or from a user to generate a plurality of profiles for persons associated with the messages, each person being a sender or a recipient of at least one of the set of messages, and the persons including a first person; generating, via the computer, a relationship history using the plurality of profiles, wherein the relationship history is for a relationship between the user and the first person; and presenting the relationship history to the user.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
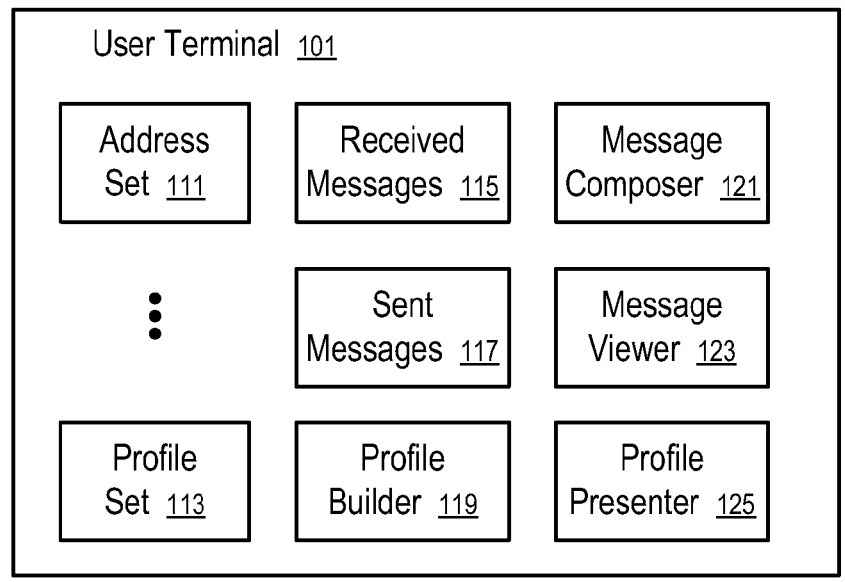
FIG. 1 shows a user terminal to provide assistance in address input according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Systems and methods are described below for the generation of a relationship history for presentation to a user (or for other use of the data in a generated relationship history by, for example, a different computer system) in an automated way. The relationship history may be presented to the user in various ways. For example, when the user is composing a message to a person, or viewing a message received from the person, the relationship history may be presented in a side bar or window as a part of the user interface by which the user is composing or viewing the message.

In other embodiments, the relationship history may be presented to the user after searching for and retrieving a person profile or other information about the person. The relationship history presents information to the user regarding prior communications between the person and the user (e.g., the friend that made the first introduction between the person and the user, and/or the date of first introduction). In various embodiments, this first introduction is inferred as being a first message or communication with the user on which the name of the person appears (e.g., as an address or otherwise, such as a mention of the person's name in the body of a message to the user from an existing friend of the user). In other embodiments, other forms of data analysis may be used to determine the friend or other person (or even an automated computer system) making the first introduction to the user.

In one embodiment, a user terminal is configured to provide assistance for the completion of inputting an address when the user is composing a message. While the user is typing to provide an input to specify an address for a message, the user terminal uses the incomplete input that has been provided to an address field so far by the user to identify one or more options or suggestions to complete the input, and thus allows the user to complete the input by selecting one. When composing this message, the user may make reference to a side bar that presents relationship history about the recipient (e.g., information stored on the user terminal for this recipient may have been searched by the user during composition of the message). For example, the relationship history may indicate the person or computer system that first introduced the recipient to the user.

In one embodiment, the user terminal is configured to search a profile set to search for a portion of the candidates that matches the incomplete input provided by the user. The profile set contains information about a plurality of persons, to whom the user may or may not have previously sent a message. In one embodiment, the profile set may additionally store interesting facts about persons, such statistical data about correspondence between users or trivia extracted from the content of such information.

In one embodiment, a user terminal is configured to provide assistance in connection with a signature block. After a message composer receives one more addresses for the recipient of the message that is being composed in the message composer, the user terminal is configured to adjust a signature block for the message in an automated way. For example, when there is one address specified for the message, the user terminal may search a profile set to locate a profile associated with the person to whom the address relates. The profile may include information about the person, which can include, for example, statistical information about correspondence between the user and the person. The profile information is then used to automatically populate a customizable signature block for, for example, an email.

In one embodiment, where multiple addresses are entered, the user terminal can be configured to locate a profile associated with the user. The profile comprises information about the user which can include, for example, statistical information about the user. The profile information is then used to automatically populate a customizable signature block for, for example, an email.

FIG. 1 shows a user terminal to provide assistance in address input according to one embodiment. The user terminal may be implemented as a personal computer, a web enabled television set, a personal digital assistant (PDA), or a mobile phone, using special purpose hardware (Application-Specific Integrated Circuit (ASIC) or Field-Programmable Gate Array (FPGA)), software and a general purpose processor, or a combination of special purpose hardware and software. Thus, the disclosure is not limited to a particular implementation.

In FIG. 1, the user terminal (101) is configured to store the messages (115) received at the user terminal (101) and the messages (117) sent from the user terminal (101). The user terminal (101) includes a message viewer (123) which can be used to display a message selected from the received messages (115) or selected from the sent messages (117).

In FIG. 1, the user terminal (101) further includes a message composer (121) which is configured to present a user interface to facilitate the composition of an outgoing message.

In one embodiment, the user terminal (101) is configured to generate an address set (111) based on the addresses that have been specified in the message composer (121) for one or more previously sent messages (117). When an address is used in the message composer (121) to specify a recipient of a message, the address is added to the address set (111), if the address is not already in the address set (111).

In one embodiment, the message composer (121) uses the address set (111) to suggest candidates for the completion of an input when the user is typing an address. For example, when the characters typed in an address field are the same as the first characters in a number of email addresses in the address set (111), the message composer (121) displays the email addresses as possible candidates for the completion of the input.

In one embodiment, the user terminal (101) further includes a profile presenter (125), which can provide suggestions for completion based on the profile set (113) maintained by the profile builder (119).

In one embodiment, the message composer (121) uses addresses that have been entered to specify the recipients of messages to select profiles associated with persons to whom the addresses relate from the profile set (113). The message composer (121) then uses such profiles to automatically generate a signature block that includes at least some of the profile information. The message composer (121) can additionally include profile information for the user in the signature block.

In one embodiment, where multiple addresses have been entered into the message composer (121), the message composer (121) uses profile information for the user to automatically generate a signature block that includes at least some of the profile information. Alternatively, the message composer (121) may select one or more addresses and customize the signature block based on the selected one or more addresses. The profile presenter (125) may rank the addresses and select the top one or more addresses to customize the signature block.

In one embodiment, the message composer (121) enables the user to customize generated signature blocks by entering and/or formatting the text of the signature block, and/or including specific profile information in the signature block. In one embodiment, the profile presenter (125) presents suggestions for data available in the profile set (113) that can be included in a signature block. In one embodiment, the message composer (121) saves signature block customizations for use in subsequent messages. For example, customizations to a signature block for a specific person could be saved to that person's profile in the profile set (113). Where a signature block customization relates to a group of persons, the customizations could be stored in a separate data store or, alternatively, not stored at all. In some embodiments, the customization may include the use of a blank signature block.

In one embodiment, the profile builder (119) is configured to extract profile data of various persons based on the received messages (115) and the sent messages (117). The profile builder (119) can extract information about persons not only from the headers of the messages where the senders and the recipients of the messages are specified, but also from the bodies of the messages and from other online sources, such as online directories, social networking websites, web pages, result pages found by search engines, etc.

Since the profile builder (119) obtains the profile data for various persons referenced in the messages (115 and 117), the profile set (113) is more comprehensive than the address set (111).

In one embodiment, the profile builder (119) is configured to scan the received messages (115) and the sent messages (117) for email addresses and names associated with the email addresses. The profile builder (119) generates a profile for each person identified to create the profile set (113). When new messages are received or sent, the profile set (113) is updated based on the new messages.

In some embodiments, the profile builder (119) may further identify persons based on scanning the received messages (115) and the sent messages (117) for phone numbers, names, addresses, etc.

In some embodiments, some or all of the components (111-125) in the user terminal (101) may be hosted on a server remote to the user terminal (101) (e.g., accessible via a website and a web browser). For example, in one embodiment, the received messages (115) and the sent messages (117) may be hosted on a web site; and the user can use a web browser to view a selected one of the messages (115 and 117).

For example, the profile builder (119) may be configured to communicate with the server to extract the profile set (113) from the messages (115 and 117) hosted on the server. Alternatively, the profiler builder (119) may also be hosted on the server to build the profile set (113) on the server.

Figure 2:
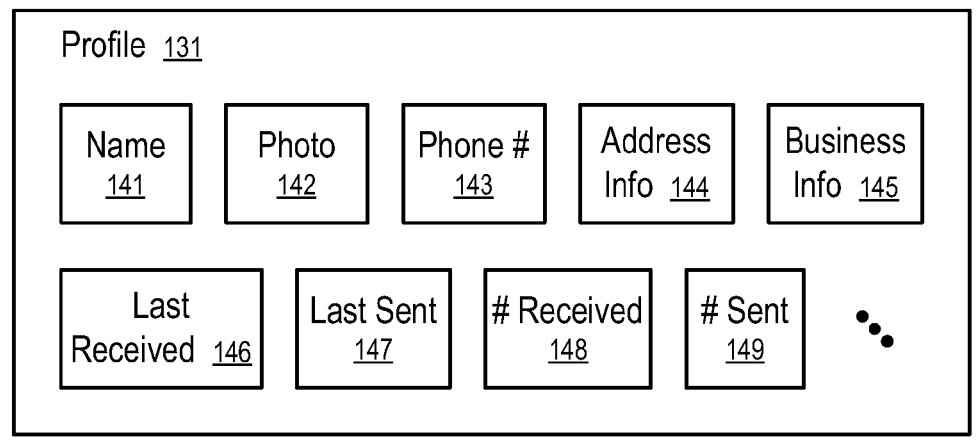
FIG. 2 illustrates a profile of a person according to one embodiment.

FIG. 2 illustrates a profile of a person according to one embodiment. In FIG. 2, the profile (131) includes various fields, such as the name (141) of the person, a photo image (142) of the person, one or more phone numbers of the person (143), address information (144) (e.g., email address, IM address, street address), business information (145) (e.g., employer, work address, job title), the date and time of the last message received from the person (146), the date and time of the last message sent to the person (147), the total number of messages received from the person (148), the total number of messages sent to the person (149), etc.

In one embodiment, the profile builder (119) obtains at least some of the information for the fields from the received messages (115) or the sent messages (117) to identify the person, and then uses other information sources to obtain the data for the other fields in an automated way to collect the profile information on behalf of the user.

For example, the profile builder (119) may use social networks, search engines, photo services, etc. to obtain the photo (142), the business information (145), etc.

Figure 3:
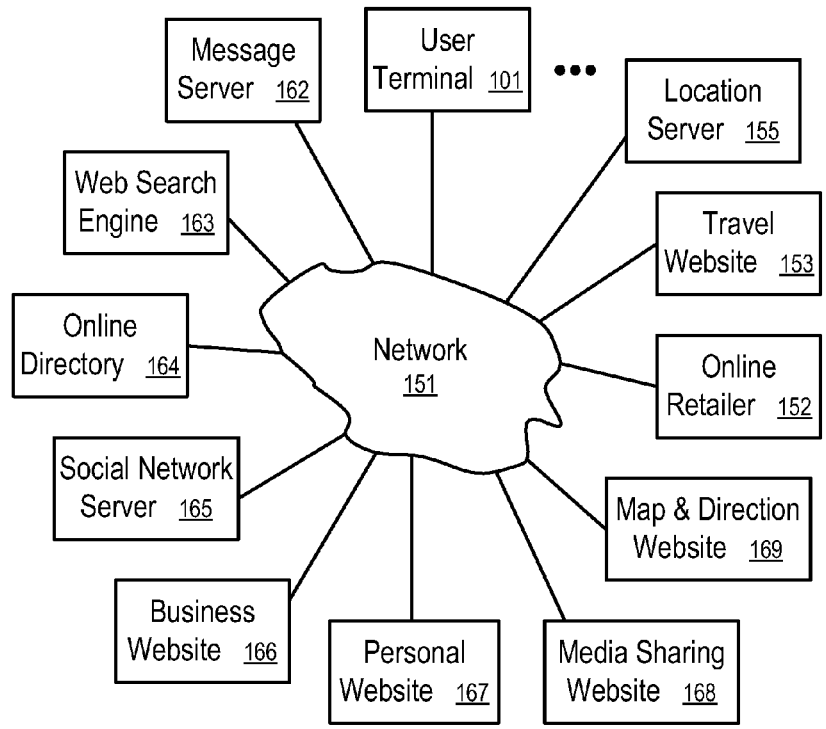
FIG. 3 illustrates a system to obtain data for a profile according to one embodiment.

FIG. 3 illustrates a system to obtain data for a profile according to one embodiment. In FIG. 3, under the control of the profile builder (119), the user terminal (101) may communicate with various servers in an automated way to extract data for the profile (131) over the network (151). The network (151) may include a local area network, a cellular telecommunications network, a wireless wide area network, a wireless local area network, a wireless personal area network, an intranet, and/or Internet.

In one embodiment, the user terminal (101) communicates with the message server (162) to receive and send the messages (115 and 117).

In one embodiment, after the profile builder (119) extracts from the messages (115 or 117) certain information (e.g., an email address, an IM user name, a phone number, and/or a name) about a person, the profile builder (119) uses the extracted information to query various servers to obtain further information (e.g., photo (142), phone number (143), address information (144), and/or business information (145)) about the person to create the profile (131).

For example, the user terminal (101) may query a web search engine (163), an online directory (164), a social network server (165), a business website (166), a personal website (167), a media sharing website (168), a map and direction web site (169), an online retailer (152), a travel website (153), a location website (155), and/or other servers. Information that can be used as search criteria include names, screen names, social network profile names, social network profile URLs, physical addresses, website URLs, email addresses, or telephone numbers. Information that is collected as a result of these queries may be used in future searches to identify additional information that may be used to create a person profile.

For example, the user terminal (101) may receive an email sent by a person via the message server (162). The profile builder (119) of the user terminal (101) is configured to perform a search using the web search engine (163) with the email address of the person as the search criteria. The search engine (163) may return a search result that includes the phone number (143) of the person. The profile builder (119) extracts the phone number (143) from the search result and stores the phone number (143) as part of the profile (131) of the person. The search engine (163) may also return the URL for or link to a personal website (167) belonging to the person. The personal website (167) may contain additional information about the person that may be used to create a person profile, such as additional contact information or biographical information.

In another example, the email address belonging to the person may include an extension (or domain name) for a company. The profile builder (119) of the user terminal (101) is configured to perform a search using the search engine (163) with the email extension (or domain name) as the search criteria. A result returned by the search may be a business website (166). The profile builder (119) of the user terminal (101) is further configured to search the business website (166) to obtain information relevant to the profile (131) of the person. For example, a web page on the business website (166) may contain additional information about the person that may be used to create a person profile, such as business information (145), additional contact information or biographical information.

In another example, the profile builder (119) of the user terminal (101) is configured to perform a search using an online directory (164) (e.g., a person search directory, a yellow page directory) with the name (141) of the person or other contact information as the search criteria. The online directory (164) may return search results that include additional contact information and other information that may be used for the profile (131) of the person.

In another example, the user terminal (101) may receive an email sent by the person via the message server (162). The email may contain a social network user name for the person. The profile builder (119) of the user terminal (101) is configured to extract this social network user name from the email and use it to access the social network server (165). A webpage on the social network server (165) may contain additional contact information and other information that may be extracted and used by the profile builder (119) to create the profile (131) of the person. The webpage on the social network server (165) may also contain additional contacts that may be associated with the person in the profile (131). For example, persons on the friends list of the webpage on the social network server (165), or persons who have posted comments or messages on the social network server (165) may be listed as contacts in a contact network for the person.

In another example, a search performed using the search engine (163) may return a URL or link for a media sharing website (168) (e.g., for sharing photos or videos). The media sharing website (168) may store profile information about the person. Thus, the profile builder (119) of the user terminal (101) can extract additional contact information or biographical information from the media sharing website (168) for the creation of the profile (131) of the person. For example, a profile belonging to the person on a video sharing website may include an instant message screen name (user name) for the person. This screen name may be extracted and displayed as part of the profile (131) of the person.

In one embodiment, information extracted from communications between the person and other users may also be used to update profile information on a social network server (165) or other websites. For example, the profile builder (119) of the user terminal (101) may detect that the person has primarily used email address "david@foo.com" in recent communications, whereas the profile of the person on the social network server (165) shows his email address as "david@bar.com." The profile builder (119) of the user terminal (101) can share the new email address of the person with the social network server (165) to allow the social network server (165) to automatically update the corresponding information about the person, or to suggest the person to make an update based on this changed behavior detected by the profile builder (119) of the user terminal (101).

In one embodiment, the profile builder (119) of the user terminal (101) can also extract information about the person from the travel website (153) and the online retailer (152) for the creation of the profile (131) of the person. For example, after an email containing information about a flight itinerary is received in the user terminal (101), the profile builder (119) of the user terminal (101) may extract a flight number or other information about a flight from the email. The profile builder (119) of user terminal (101) then queries the travel website (153) using the flight number or other flight information as search criteria. Information about the flight, such as the destination city or the departure city, expected departure time, expected arrival time, expected delays, weather in the destination city, weather in the departure city, or any changes to the flight may be used as part of the profile (131) of the person.

In another example, an email containing information about an item or service that the second user is interested in purchasing may be received in the user terminal (101). The profile builder (119) of user terminal (101) is configured to query one or more search engines, websites, or on-line retailers (152) to determine which retailer or website has the best price or currently has the item in stock or the service available. This information is extracted by the profile builder (119) and displayed by the profile presenter (125) as part of the profile (131) of the person.

In one embodiment, the profile builder (119) of the user terminal (101) can also extract information from a map and direction website (169) and location servers (155) as part of the profile (131) of the person. For example, the person may own a GPS unit, cell phone, or other device that is capable of transmitting the person's current physical location to the location server (155), which allows other users to access the person's current location information. If the user of the user terminal (101) has permission to view the location information of the person, the profile builder (119) of the user terminal (101) may access the location server (155) over the network (151) to receive location information about the person. This location information can be displayed as part of a person profile.

The profile builder (119) of the user terminal (101) may also access the map and direction website (169) to create a map of the current location of the person, or to generate directions to the current location of the person. The map or directions may be displayed by the profile presenter (125) as part of the profile (131) of the person. The map and direction website (169) may also be used to generate a map or directions to one or more known street addresses of the person, such as a work address or home address. The map or directions can be displayed by the profile presenter (125) as part of the profile (131) of the person.

Figure 4:
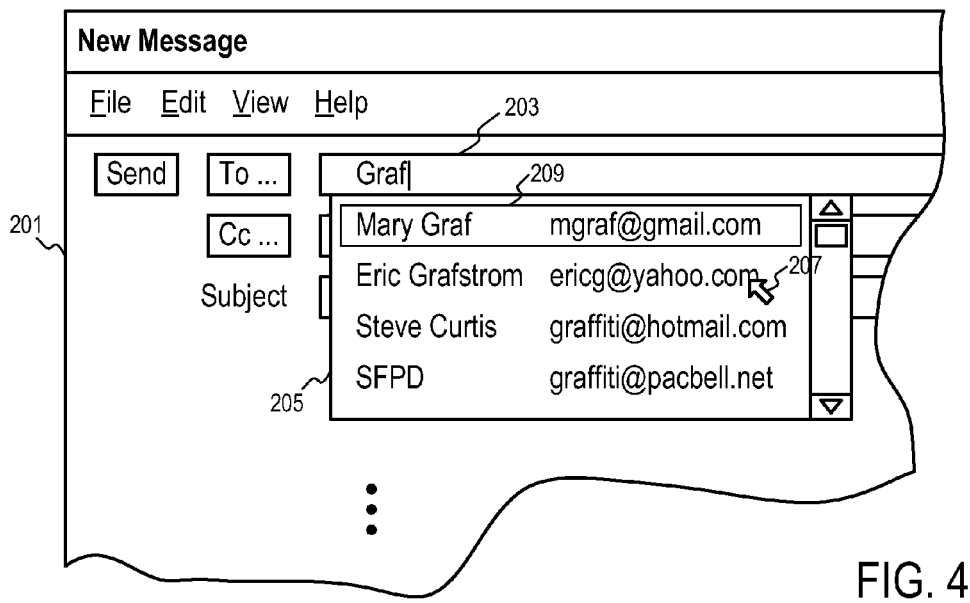
FIG. 4 illustrates a user interface to provide assistance in address input according to one embodiment.

FIG. 4 illustrates a user interface to provide assistance in address input according to one embodiment. In FIG. 4, the user interface (201) is configured for composing an outgoing message. The user interface (201) includes entries to specify the addresses of the recipients of the message. For example, the entry box (203) is configured to receive the email address of an outgoing email, which may be sent from the user terminal (101) via the message server (162).

In one embodiment, when the entry box (203) detects a change in the content received in the entry box (203) (e.g., a keystroke is received in the entry box (203), as the user types a letter on a keyboard to provide an input), the profile presenter (125) determines a set of suggestions for the completion of the input in the entry box (203). The profile presenter (125) uses the incomplete input in the entry box (203) as a search criterion to find from the profile set (113) a set of suggestions for the complete address input. The suggestions are presented in the window (205) as a selectable list.

In one embodiment, when the message composer (121) has an existing, native mechanism for displaying suggestions (e.g., making suggestions based on address set (111)), the profile presenter (125) can be configured as an add-on module to display these suggestions as well and to hide the native mechanism of the message composer (121) for displaying suggestions.

In FIG. 4, the item (209) on the top of the list is highlighted; and the user may select the highlighted item (209) with a keystroke (e.g., pressing Tab key, Enter key, Home, End, PgUp, PgDown, etc.). The user may use the arrow keys to move the highlight up or down the list to highlight a different item, or provide additional input in the entry box (203) to cause the profile presenter (125) to update the suggestions in the window (205). The user may also use the cursor (207) to select an item using a cursor control, such as a mouse, a track ball, a touch pad, a touch screen, etc.

In one embodiment, when the message composer (121) has an existing, native mechanism that uses these keys for the display of suggestions, the profile presenter (125) configured as an add-on module can hide these keystrokes from the native mechanism. For example, the In one embodiment, after an item is selected from the list presented in the suggestion window (205), the address represented by the item is inserted by the profile presenter (125) into the entry box (203) to replace the corresponding portion that is used to suggest the selected item; and the suggestion window (205) is closed automatically.

In some embodiments, the message composer (121) may be configured to perform post-processing, such as name checking, on the inserted text in the entry box (203) a few moments after the text has been inserted. The insertion by the profile presenter (125) is performed in a way that allows such post-processing by the message composer (121) to continue functioning. For example, if the message composer (121) loses focus or activation, it starts post-processing the entries in the textbox. The profile presenter (125) is configure temporarily prevent this from happening while the suggestion window (205) is visible and causes this to happen when the suggestion window (205) is closed. To hide the suggestion window (205), the suggestion window (205) is configured as a topmost window that is initially not activated. The Outlook textbox window is subclassed via a code-injection mechanism to temporarily preventing it from getting "kill focus" messages (e.g., through intercepting such messages, and then throwing them away). After the suggestion window (205) becomes invisible, the profile presenter (125) sets the focus back to the textbox window and causes the post-processing to be performed.

For example, in FIG. 4, the incomplete input "Graf" is received in the entry box (203). The cursor "|" in the entry box (203) indicates the insertion point for subsequent keystrokes received in the user terminal (101). While the entry box (203) is expecting additional input from the user, the profile presenter (125) uses the incomplete input "Graf" to identify a set of suggestions, such as mgraf@gmail.com for Mary Graf, ericg@yahoo.com for Eric Grafstrom, graffiti@hotmail.com for Steve Curtis, graffiti@pacbell.net for SFPD, etc., based on the profile set (113) established by the profile builder (119).

In one embodiment, the suggestions are identified by matching the incomplete input with names, addresses and/or other profile data of the persons in the profile set (113). The incomplete input may match the beginning of a last name, the beginning of a first name, the beginning of the name of an organization, the beginning of a domain name of an email address, the beginning of the top level domain name of an email address, the beginning of the email prefix, the beginning of a word in the job title (or the beginning of the job title), the beginning of the city of the person, etc. In some embodiments, when an email prefix contains one or more separators, such as "_" or "." or "-", the email prefix is broken down into segments or chunks; and the incomplete input may be match the beginning of any of the segments or chunks. When there is a match, the person can be selected as a candidate for the suggestions. Thus, the searching for a match is not limited to matching the beginning of an address that the user has previously typed for a previous outgoing message.

In FIG. 4, the top item, mgraf@gmail.com for Mary Graf, is highlighted and can be selected by pressing the Tab key or the Enter key. Alternatively, the user may select the second item, ericg@yahoo.com for Eric Grafstrom, by pressing a mouse button while the cursor (207) is over the second item. The profile presenter (125) is configured to use the selected address to replace the incomplete input "Graf" received in the entry box (203).

In FIG. 4, if the user further types a letter "f", the profile presenter (125) will use the incomplete input "Graff" to eliminate some suggestions (e.g., mgraf@gmail.com for Mary Graf, ericg@yahoo.com for Eric Grafstrom) and update the list in the suggestion window (205).

Thus, the profile presenter (125) uses the profile set (113) to identify suggestions based on incomplete input provided in the entry box (203) and to allow the user to select a suggestion to complete the input.

FIG. 4 illustrates an example in which the suggestion window (205) is presented to provide suggestions for the completion of an address input in the "To" field of the user interface (201) for composing an outgoing message. Similar suggestions can be provided when the user is typing in other fields that are configured to receive address inputs, such as the "CC" field, or "BCC" field, of a user interface for composing an outgoing email message. Further, the suggestions can be provided when the user is typing in other types of user interfaces that are configured to receive address inputs, such as a user interface to edit a contact entry, a profile page, etc. Thus, the invention is not limited to the user interface for composing an email message.

Figure 5:
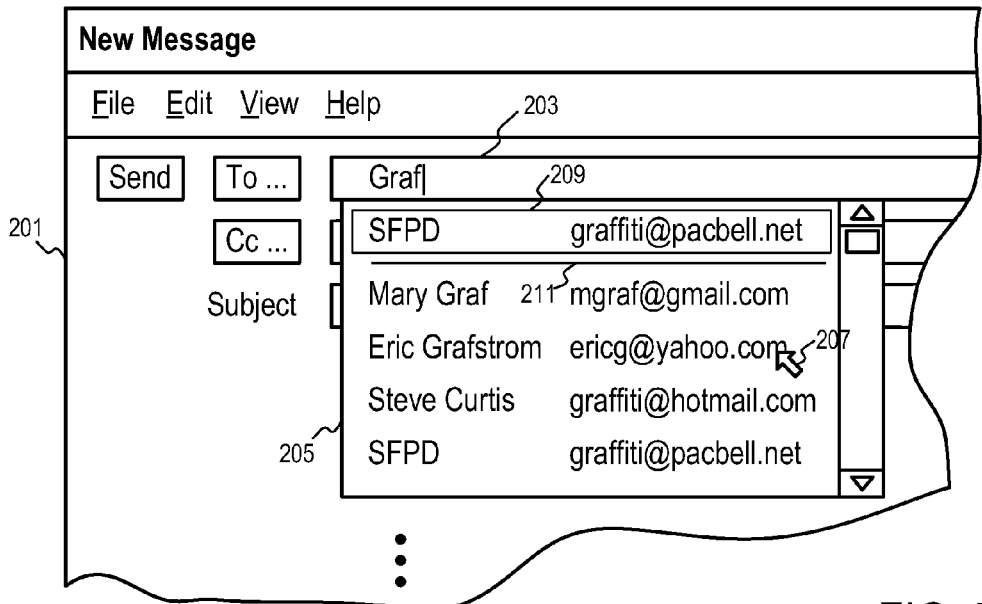
FIG. 5 illustrates another user interface to provide assistance in address input according to one embodiment.

FIG. 5 illustrates another user interface to provide assistance in address input according to one embodiment.

In FIG. 5, the suggestions are presented as two parts. The part above the separator (211) is identified from the address set (111) and the part below the separator (211) is identified from the profile set (113).

In one embodiment, the address set (111) is generated by collecting the addresses that have been previously specified in the address fields of the message composer (121) of the user terminal (101). In one embodiment, the suggestion above the separator (211) is identified by matching the incomplete input "Graf" with the starting letters of the addresses in the address set (111). The addresses in the address set (111) that have the leading characters "graf" are selected to generate the suggestions above the separator (211).

In one embodiment, the message composer (121) has an existing, native mechanism for displaying suggestions (e.g., making suggestions based on address set (111)). The profile presenter (125) is configured to obtain the suggestions from the native mechanism (e.g., via scraping, inspecting, querying, etc.) and displays the suggestions above the separator (121).

In one embodiment, the suggestions presented above the separator (211) are identified by the message composer (121). The profile presenter (125) obtains the suggestions from the message composer (121), presents the suggestions in the suggestion window (205), hide the suggestions the message composer (121) would have shown (and thus prevents the message composer (121) from presenting the suggestions in a separate window).

In another embodiment, the profile presenter (125) shows the suggestions based on the profile set (113) in one suggestion window; the message composer (121) shows the suggestions in a different suggestion window; and the profile presenter (125) aligns its suggestion window with the suggestion window of the message composer (121) so that the two suggestion windows appear like two panels of a large window. Alternatively, the profile presenter (125) presents its suggestion window over the suggestion window of the message composer (121) (to cover up and thus effectively disable the suggestion window of the message composer (121)). In one embodiment, the profile presenter (125) causes the suggestion window of the message composer (121) to be invisible on subsequent invocations to hide the suggestion window of the message composer (121).

In another embodiment, the profile presenter (125) uses the address set (111) to identify the suggestions presented above the separator (211) in the suggestion window (205), using the same approach the suggestion window of the message composer (121) would use.

In one embodiment, the profile presenter (125) includes an auto suggest manager. The auto suggest manager can turn on or turn off the feature of auto suggestions generated based on the profile set (113) in accordance with the preferences of the user. The auto suggest manager provides encapsulation, providing an easy interface for external applications to use the auto suggest feature without understanding its implementation. It provides a mechanisms to add the auto suggest feature to a new window (message, contact, etc.), to "clean up" or remove the auto suggest feature from a window or all windows, to allow logging of auto suggest state and problems, and to determine any special preferences the user may have set in the native client (e.g., Outlook).

In one embodiment, the profile presenter (125) includes a suggestion window (205) that presents a dialog box or a list box to show the suggested results. The profile presenter (125) includes a view controller to show or hide the suggestion window (205). The view controller also positions the suggestion window (205) in the correct location (which varies as the user types in text), participates in "hiding" the suggestion window (205) from the native application (e.g., Outlook) so that the native application is not aware of the existence of the suggestion window (205), and notify other modules of navigation commands (PgUp, PgDown, etc.) and user selections. When a selection or keyboard command (e.g., arrow keys, tab return) related to the suggestions occurs, the suggestion window (205) (or a keyboard hook or the inspector controller, discussed below) provides messages to the view controller for processing.

In one embodiment, the profile presenter (125) further includes a result controller, which decides what results to show and when. After the profile presenter (125) detects that the user is typing in an address field (e.g., To, CC, or BCC fields of a window to compose an email), the result controller uses the incomplete input as a search criterion to search for the suggestions based on the profile set (113) and/or based on the address set (111). The view controller causes the display of the suggestion window (205) to show the search results. If the user selects a suggestion from the window (205), the address corresponding to the user selection is put into the address field.

In one embodiment, the profile presenter (125) is implemented as an add-on module for an existing communications client, such as Microsoft Outlook, which can make suggestions by selecting from the address set (111) the email addresses that start with the incomplete input typed by the user in the address field. The suggestion window (205) of the profile presenter (125) subclasses the suggestion window of the existing communications client; and the profile presenter (125) hides the suggestion window of the existing communications client and creates a keyboard hook as wells as a subclass mechanism using code-injection to intercept keyboard messages and other messages sent to the hidden suggestion window of the existing communications client to prevent it from processing these keys (e.g. PgUp, PgDown, Tab, Return), and also to cause it to process fake keystrokes or other messages (e.g. to implement "delete" functionality"). In one embodiment, the keyboard hook is a global WH_KEYBOARD_LL hook; in another embodiment, the keyboard hook is a WH_KEYBOARD hook. In one embodiment, the profile presenter (125) creates only one such keyboard hook per thread (especially for the WH_KEYBOARD hook).

In one embodiment, the result controller is configured to handle a rapidly typing user, by stopping a previous search and then starting a new search. For example, if a search for suggestions is started based on the initial input "er" and before the suggestions are displayed the user further typed "ic" to provide the input "eric", the result controller stops the search for suggestions based on "er" and starts a new search for suggestions based on "eric".

In one embodiment, an inspector controller is used to hook the functionalities of the profile presenter (125) with the existing communications client, which may be the message composer (121) in one embodiment. When a window for the message composer (121) is constructed and shown, the inspector controller determines whether the user is typing in a field (e.g., entry box (203)) that is configured to receive an address. If the user is typing in an address field, the inspector controller instantiates a keyboard hook to obtain what the user types in the address field to allow the profile presenter (125) to generate the suggestions based on the profile set (113).

In one embodiment, the inspector controller determines if the window should have auto suggest functionality. Read-only windows or unsupported type of windows should not have the auto suggest functionality. The inspector controller then searches for suitable textboxes (using a "Control Calculation mechanism") that should have auto suggest functionality attached to them. Since the native client (e.g., Outlook) has many configurations ("use Word Editor", use "RTF Editor", etc.), different mechanisms are used and a fallback mechanism in case the initial search for a suitable window fails, and in some cases, additional code injection is required because the native client (e.g., Outlook) uses a different process for different windows. The inspector controller uses a "SetProp" mechanism to "remember" which windows have already been subclassed so that auto suggest functionality is correctly added to the newest window. Additionally, the inspector controller keeps track of which textbox (To, Cc, Bcc, etc.) the user is currently using. The inspector controller also is responsible for putting the user's selection (from the dialog) into the selected textbox control. The inspector controller also watches for various windows message in the various subclassed windows (e.g. Activation, Focus, Keyboard), "hiding" (or "eating") some of these message from the native client (e.g., Outlook) so as not to break other existing functionality of the native client (e.g., Outlook), and using others to notify the view controller that it should hide or show or change the suggestion window (205). In addition to the subclass of the "TextBox" and "Outlook AutoSuggest" window, the main composer window is subclassed as well, and may subclass others in the future. Note that this subclassing mechanism is implemented using code injection and could in the future also be implemented using other mechanisms. Code injection "injects" our code into another program (e.g. Outlook or Word) while it is running.

In one embodiment, the inspector controller subclasses the textbox (and also the parent window) into which the user is typing to receive the keys typed by the user, generate requests for new suggestions in response to keys typed by the user, scroll through the suggestions (e.g., when the user presses arrow keys), indicate a selection by the user (e.g., when the user presses Tab or Enter key) (some embodiments use subclass, some embodiments keyboard hook), the profile presenter (125) hide these keystrokes from the native client (e.g., Outlook window) (by "eating" or consuming the messages), and hide the suggestion window (205) when the keyboard focus is moved out of the textbox or user has activated another application or user has finished selection. The inspector controller instantiates the view controller to process the user input and subclasses the suggestion window of the message composer (121) to create the suggestion window (205). The inspector controller (or the keyboard hook) contacts the view controller to process the user inputs when various keys are received in the textbox in which the user is typing.

In one embodiment, a window driver is used to work with the message composer (121) to obtain current caret position (the position of the text insertion point indicator). In response to the requests from the inspector controller and the suggestion window (205), the window driver may selectively block messages from being passed on to other windows. When a selection is made, the window driver is configured to replace the incomplete input in the address field with the address corresponding to the selection.

In one embodiment, the profile presenter (125) is implemented as an add-on module to a native client, such as Outlook. The Outlook textbox windows are in some cases "rich edit controls" which allow other controls to be embedded in them. The profile presenter (125) walk both the text and these embedded COM controls using COM (also known as OLE or ActiveX programming) to determine where the user is currently entering text (ignoring any other text or embedded controls before or after the current email address) so that the profile presenter (125) can correctly determine where the current user's entry begins and ends, what text to use to create suggestions for, and also which part of the text (or embedded controls) to replace.

In one embodiment, the profile presenter (125) uses a person-centric approach to identify the suggestions. The partial input (e.g., "Graf" received in the entry box (203)) is used to match the names of the persons to identify the persons in the profile set (113) (e.g., the first name, the last name, the nickname, etc.). The profile presenter (125) sorts the matched persons based on a relationship score determined from the statistical data derived at least in part from the received messages (115) and the sent messages (117).

Figure 6:
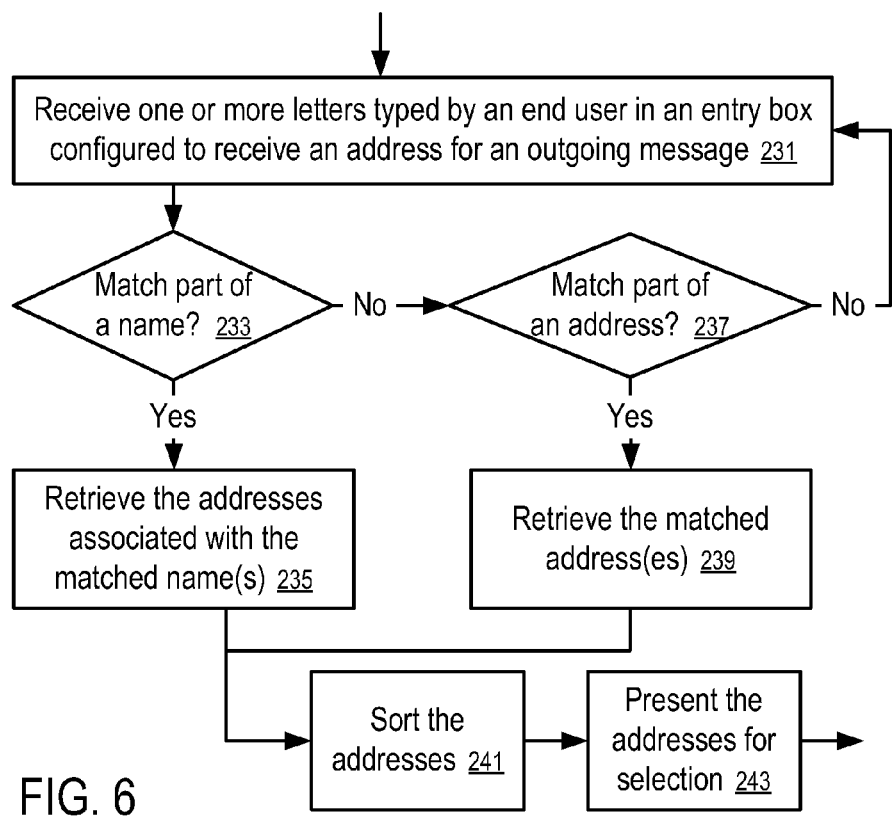
FIG. 6 shows a method to select suggestions to complete address input according to one embodiment.

FIG. 6 shows a method to select suggestions to complete address input according to one embodiment.

In FIG. 6, after receiving (231) one or more letters that are typed in by an end user in an entry box configured to receive an address for an outgoing message, the profile presenter (125) determines (233) whether the one or more letters match part of a name in the profile set (113). If there is a match (or more than one match), the profile presenter (125) retrieves (235) the addresses associated with the matched name(s), sorts (241) the addresses, and presents (243) the addresses for selection in suggestion window (205).

In FIG. 6, if there is no name that matches the one or more letters, the profile presenter (125) determines (237) whether the one or more letters match part of an address in the profile set (113). If there is a match (or more than one match), the profile presenter (125) retrieves (239) the matched address(es), sorts (241) the addresses, and presents (243) the addresses for selection in suggestion window (205).

Thus, the user can input the names of the recipient to cause the profile presenter (125) to identify the persons with names matching the input to select the person and thus select the address of the person. The names of the recipient do not have to be part of the addresses to be matched and suggested.

In one embodiment, when a person has multiple addresses, the suggestion window (205) shows multiple suggestions for the addresses presented with the name of the person.

In another embodiment, when a person has multiple addresses, the suggestion window (205) shows one entry to suggest the person. If the person is selected, the suggestion window (205) is then updated to show a list of addresses of the person. If the user selects one or more addresses, the profile presenter (125) replaces the name of the person with the selected address(es) of the person; if the user does not select any of the multiple addresses, the profile presenter (125) replaces the name of the person with all of the multiple addresses. In one embodiment, if the user does not select any of the multiple addresses of the person, the profile presenter (125) replaces the name of the person with the top ranked address of the person in the To field and inserts the other addresses of the person in the CC or BCC field (or uses the top ranked address without using the other addresses of the person).

In FIG. 6, the profile presenter (125) attempts to first match names of the persons in the profile set (113) and, if there is no match in names, then match addresses of the persons in the profile set (113).

In another embodiments, the profile presenter (125) may perform a search to match the beginning of a number of fields in the profile set (113), such as, different fields of names of the persons in the profile set (113), different segments of email addresses of the persons in the profile set (113), the names of cities (or states or countries) of the persons in the profile set (113), different words in the street addresses of the persons in the profile set (113), different words of job titles of the persons in the profile set (113), screen names of the persons in the profile set (113), etc. Examples of different fields of names include first name, last name, middle name, nick name, etc. Examples of different segments of email addresses include segments or chunks of an email prefix separated by a separator, such as "-", ".", or "_", different levels of domain names of an email address, etc. In some embodiments, the names of the persons are as part of the email addresses. In some embodiments, the names are from fields separated from the email addresses.

When the profile presenter (125) searches different types of fields, a match in different types of fields may be weighted differently. For example, a match in a name field may be given a first weight (e.g., 10), a match in an email prefix segment may be given a second weight (e.g., 8), a match in the top level domain name may be given a third weight (e.g., 1), and a match in other domain names (e.g., second level domain name, or lower level domain names) may be given a fourth weight (e.g., 2), etc. When a person or an address has multiple matches in different fields, the weights for the multiple matches may be added to compute the weight for the person or address. Alternatively, the highest weight for the multiple matches can be selected as the weight for the person or address. The weights for the matched persons or addresses can be used to sort the persons or addresses for selection of up to a predetermined number of suggestions for presentation to the user. For example, the weights can be applied to the relevancy scores of the matched persons or addresses to determine relevancy scores for suggesting the persons or addresses; and the profile presenter (125) selects up to a predetermined number of matched persons or addresses that have the highest relevancy scores for suggesting the persons or addresses.

In FIGS. 4 and 5, the suggestions presented based on the profile set (113) are shown as a list of entries, where a typical entry includes the name and the address of the person. However, in other embodiments, the entries may further include other information, such as a photo image of the person, a job title of the person, a business association of the person, etc. In some embodiments, other details of the profile of the person are shown in a separate window when the cursor is positioned and remains positioned on the entry for the person (e.g., hovering over the entry).

In one embodiment, the profile presenter (125) ranks the persons for the suggestions to complete the address input, based on the relevancy index between the suggested persons and the user of the user terminal (101). When dealing with long lists of contacts, such a relevancy index helps users find the most relevant contacts first.

In one embodiment, the profile builder (119) scans the messages (115 and 117) to capture the addresses of the senders and recipients of the messages (115 and 117). Each of the captured addresses is stored in an index file. When one of those addresses is seen in a header that describes the recipients and senders, the score for the address is increased by a predetermined amount (e.g., 1). In some embodiments, the profile builder (119) further scans the body of the messages (115 and 117) to identify additional addresses.

In some embodiments, different weights/amounts are given to the score when the addresses are used in different fields (e.g., From, Reply-To, To, CC, and BCC fields of emails). For example, an amount of 3 may be given to the score when an address is found in a field that identifies the sender of the message (e.g., From or Reply-To fields of emails received by the user of the user terminal (101)); and an amount of 1 may be given to the score when the address is found in a field that identifies the recipient of the message (e.g., To, CC, and BCC fields of emails sent from the user of the user terminal (101)).

In some embodiments, the same amount is given to the score regardless of the type of fields in which the address is used (e.g., From, Reply-To, To, CC, and BCC fields of emails).

In some embodiments, the length of the elapsed time period since receipt of the message is further used to determine the amount given to the score. The occurrence of an address in a recent message can be given more weight than the occurrence of the address in a message received/sent earlier than the recent message.

Thus, after the messages (115 and 117) are processed, each of the addresses has a relevancy score. The higher the score, the more relevant the address is to the user of the user terminal (101).

In some embodiments, the relevancy score is computed from the data in the profile (131), such as the total number of messages received from the person (148), the total number of messages sent to the person (149), etc. In some embodiments, the number of messages are counted based on the types of fields in which the addresses appear and the time periods in which the messages are sent or received.

In one embodiment, the profile builder (119) further groups the addresses by the names of the corresponding persons. Each person having a name in the profile set (113) may have one or more addresses. In one embodiment, the scores for the addresses of the person are summed to generate a score for the person. Thus, the higher the score, the more relevant the person is to the user of the user terminal (101).

In one embodiment, when the suggestions are presented as a list of addresses, the scores for the addresses are used to sort the addresses. When the suggestions are presented as a list of persons, the scores for the persons are used to sort the list of names of the persons.

In another embodiment, the suggestions are presented as a list of addresses grouped according to the persons. The addresses for each person are grouped together and sorted within the group based on the scores of the emails. The groups are sorted according to the scores of the persons.

In one embodiment, the profile presenter (125) selects up to a predetermined number (e.g., 10) of candidates, after sorting the candidates for the suggestions based on the relevancy scores. The selected candidates are presented in the suggestion window (205) to help the user. Less relevant candidates are not presented in the suggestion window (205).

While some of the embodiments are discussed here in the context of composing an email message, the techniques disclosed here can also be applied to the specifying of address information for instant messaging, text messaging, dialing a phone number, etc. Instead of matching the incomplete input to the exact address, the profile presenter (125) can match the incomplete input with identifiers of the persons in the profile set (113) to identify the persons as the basis for suggestions. Examples of identifiers include nickname, first name, last name, company name, domain name, user name, screen name, phone number, etc. In one embodiment, the suggestions are searched and presented in the form of suggested persons and thus, the suggestions are person-centric.

In some embodiments, the user terminal (101) may include different communication components that require address information for different types of communications, such as email, instant messages, text messages, phone calls, etc. The profile presenter (125) may use the profile set (113) to generate the suggested candidates for completing an address input for the different types of communications.

In some embodiments, the relevancy score is computed for the person without considering the type of communications. In other embodiments, the addresses having the same type as the address to be suggested are given more weight than other types of addresses. For example, when ranking the persons for suggesting addresses for instant messaging, the addresses for instant messaging may be given more weight than addresses for other types of communications, such as email, phone calls, etc. Thus, for different types of communications, the profile presenter (125) may suggest different lists of persons based on the same profile set (113) and the same incomplete input.

Figure 7:
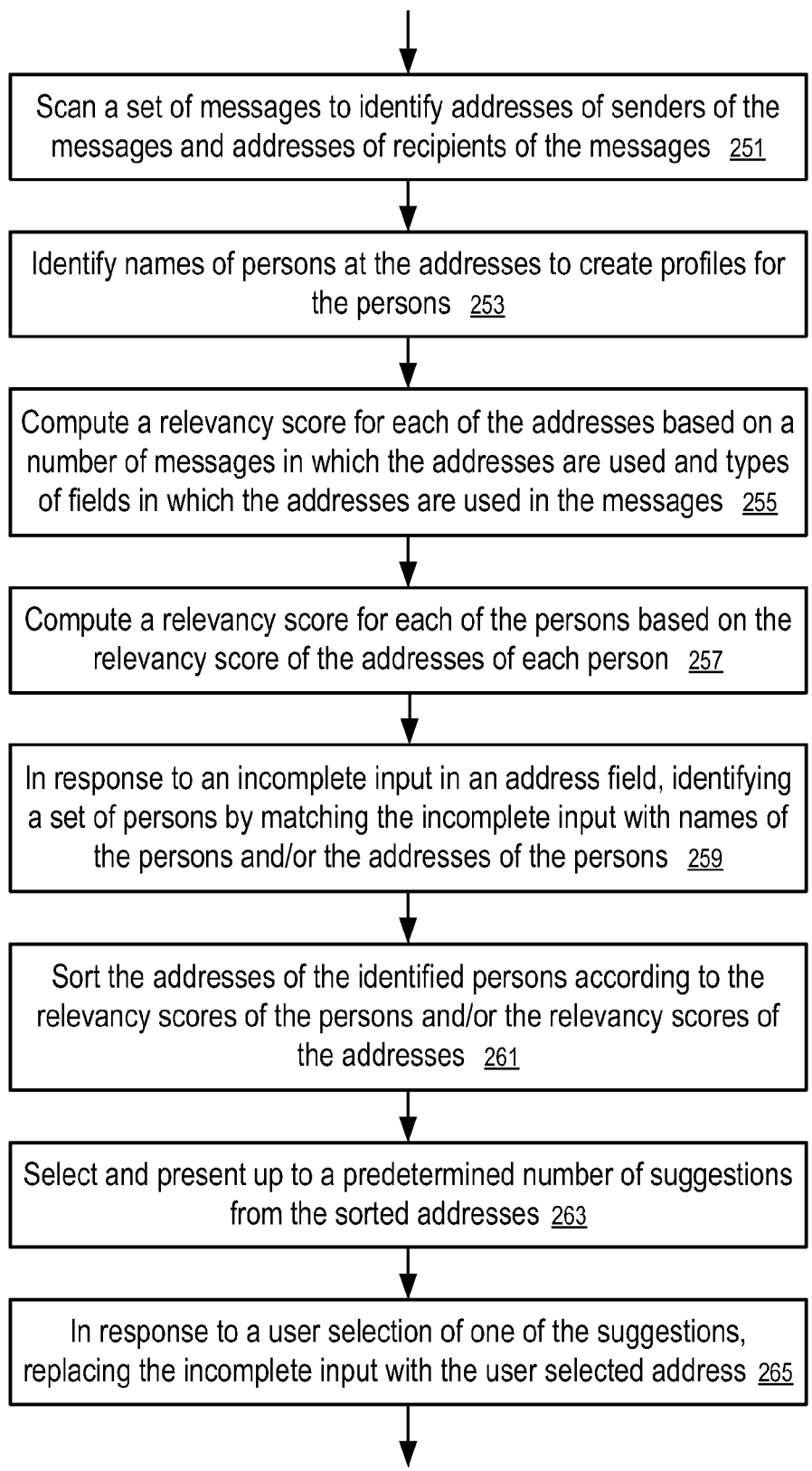
FIG. 7 shows a method to provide address assistance according to one embodiment.

FIG. 7 shows a method to provide address assistance according to one embodiment. In FIG. 7, the profile builder (119) scans (251) a set of messages (115 and 117) to identify addresses of senders of the messages and addresses of recipients of the messages in an automatic way, for example, when the profile builder (119) is installed and/or when the messages (115 and 117) are received or sent.

The profile builder (119) identifies (253) the names of persons at the addresses to create profiles (131) for the persons, based on scanning the messages (115 and 117) and/or querying other data sources in an automated way, such as the web search engine (163), online directory (164), social network server (165), and other websites.

In one embodiment, the profile builder (119) computes (255) a relevancy score for each of the addresses based on a number of messages in which the addresses are used and types of fields in which the addresses are used in the messages. For example, instances where an address is used to specify a recipient of a message sent from the user of the user terminal (101) may be given more weight than instances where the address is used to specify a sender of a message received by the user of the user terminal (101).

In one embodiment, the profile builder (119) also computes (257) a relevancy score for each of the persons based on the relevancy score of the addresses of each person.

In FIG. 7, in response to an incomplete input in an address field, the profile presenter (125) identifies (259) a set of persons by matching the incomplete input with names of the persons and/or the addresses of the persons. The profile presenter (125) sorts (261) the addresses of the identified persons according to the relevancy scores of the persons and/or the relevancy scores of the addresses, and selects and presents (263) up to a predetermined number of suggestions from the sorted addresses. In response to a user selection of one of the suggestions, the profile presenter (125) replaces (265) the incomplete input with the user selected address.

Figure 8:
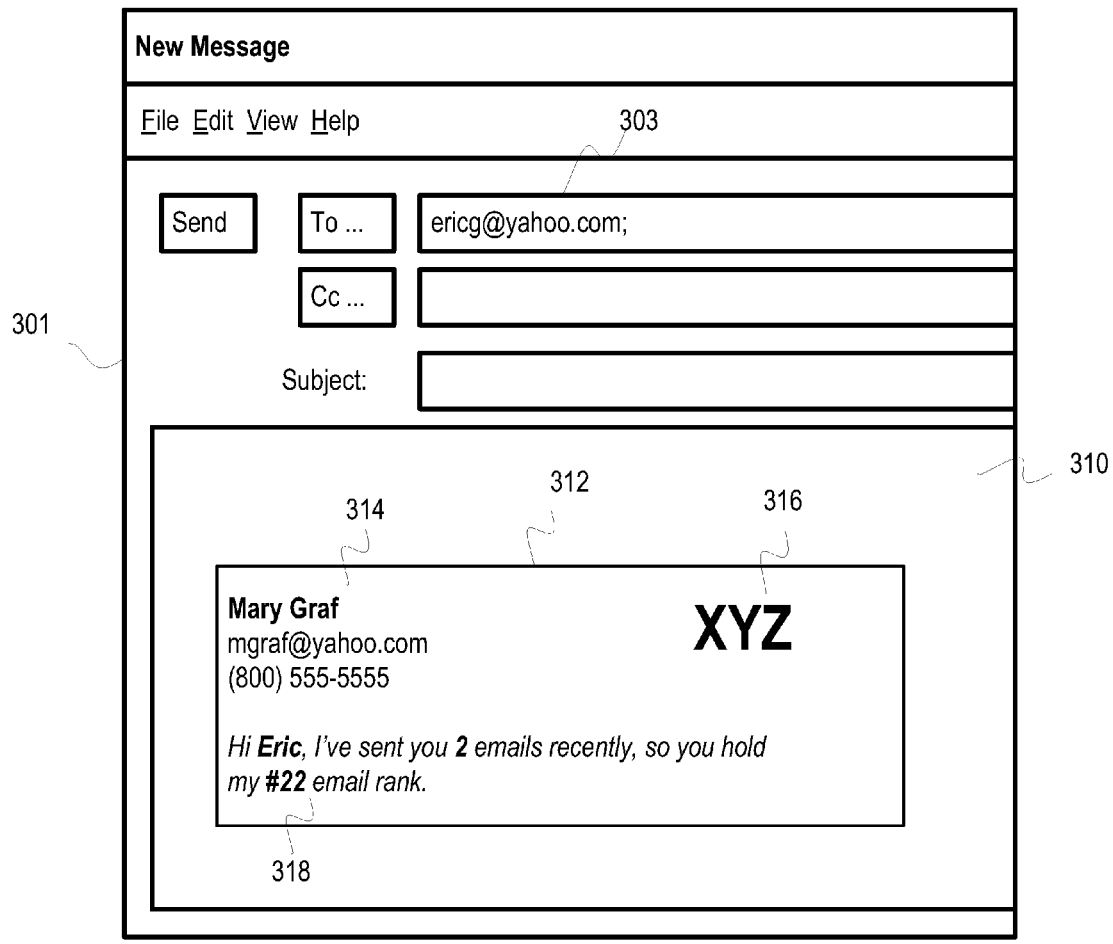
FIG. 8 illustrates a user interface to automatically generate a signature block according to one embodiment.

FIG. 8 illustrates a user interface to automatically generate a signature block according to one embodiment. In FIG. 8, the user interface (301) is configured for composing an outgoing message. The user interface (301) includes entries to specify the addresses of the recipients of the message. For example, the entry box (303) is configured to receive the email address of an outgoing email, which may be sent from the user terminal (101) via the message server (162).

In one embodiment, when the entry box (303) detects a completed address in the entry box (303) (e.g., when the user selects an address from a list of suggestions, when the keyboard input is directed away from the entry box (303), or when the user enters a valid email address followed by a semicolon, a space or a comma, or followed by pressing the "Enter" key), the message composer (121) automatically inserts (or adjusts, or replaces, or deletes) a signature block (312) at or near the end of the message body (310). The signature block (312) can be bounded by a border, as shown in FIG. 8, or alternatively, may not have a border. In one embodiment, the signature block includes information identifying the sender (314), such as, for example, the sender's name, email address, and telephone number, although any type of identifying information available about the sender, such as company name or mailing address, could be included. In one embodiment, such information could be obtained from a profile for the sender maintained on the user terminal (101). Alternatively, such information could be obtained from any other source accessible to the user terminal, such as, for example, a website, such as a social networking website, of which the sender is a member.

In one embodiment, the signature block includes a graphic element (316). The graphic element (316) could be, for example, a personal logo for the sender or an image of the sender, a logo for the sender's company, a logo for the software vendor supplying the profile presenter (125) or the message composer (121), or a fanciful or arbitrary graphic, such as a mood indicator.

In one embodiment, the signature block includes message text (318) that has been automatically customized according to the profile of the recipient. In the example in FIG. 8, the message integrates static text along with three recipient specific fields: user first name (Eric), the number of recent emails sent to the recipient (2) and an email rank (#22). In one embodiment, the data for the recipient specific fields is derived from a profile for the recipient stored on the user terminal (101). In one embodiment, the message composer (121) searches the profile set (113) to determine if there is a profile available for the recipient in the profile set (113), and if such a profile is present, it is used. Alternatively, such information could be obtained from any other source accessible to the user terminal, such as, for example, a website, such as a social networking website, which stores data relating to the recipient. The data found in the other sources can then be stored in the file of the recipient in the profile set (113).

Figure 9:
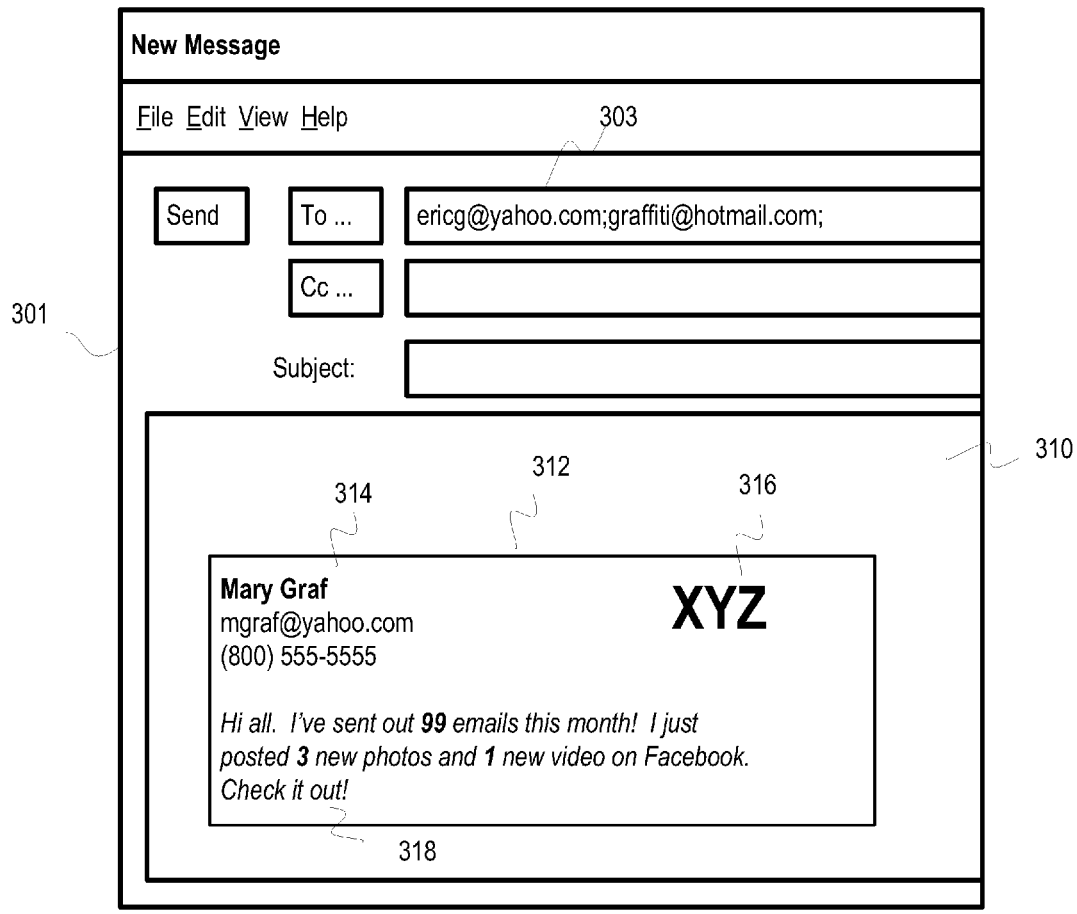
FIG. 9 illustrates a user interface to automatically generate a signature block according to another embodiment.

FIG. 9 illustrates another embodiment of the interface illustrated in FIG. 8. In the illustrated embodiment, the sender has entered more than one complete address in the entry box (303). In such case, it may be appropriate to tailor the signature block to one or more of the recipients, or none of recipients. In the illustrated embodiment, the customized message text (318) contains a field showing a total count of email messages sent by the user this month (99), and further includes text displaying counts of recent posts by the sender to her social network account (e.g. 3 new photos and 1 new video). Such information could be obtained from a profile for the sender on the user terminal (101), or could be obtained from any other source accessible to the user terminal that stores such data, such as an email server or the social network website. Alternatively, no signature block may be generated, or a simple signature block including only the sender's name may be generated. In some embodiments, the profile presenter (125) may customize the signature block based on a common characteristic of the set of recipients (e.g., company, domain, geographic location, personal or business interest, etc.). In some embodiments, the profile presenter (125) may customize the signature block based on one or more recipients selected from the set specified for the message (e.g., the recipients most closely related to the sender). In some embodiments, the profile present (125) may customize the signature block using profiles from all of the recipients.

In one embodiment, the message composer (121) may initially generate signature blocks for the sender and for individual recipients without user input. In one embodiment, such default signature blocks include the sender's contact information (stored in the profiles for the sender, gathered from emails the sender has sent and received, or stored in a customization file). This information could include the sender's name, phone numbers, email addresses, physical addresses, and so forth. The signature could also be configured to include graphics or corporation information that represents the company the sender works for. An aesthetically pleasing default layout, such as that shown in FIG. 8, could be used.

In one embodiment, the content and/or the format of the signature block (312) can be determined, at least in part, by user preferences for the sender maintained on the user terminal (101). Such preferences could indicate global preferences (e.g. for all recipients). For example, user preferences could indicate that signature blocks for single individuals include the sender's full name, email address, telephone number and business mailing address. Such preferences could be stored on a profile for the sender maintained on the user terminal (101). Preferences could additionally or alternatively be maintained for individual recipients. For example, for some users, a preference could be set to generate a blank signature block for some persons. In one embodiment, such preferences could be stored on profiles within the profile set (113) for specific persons. In one embodiment, when the sender edits the signature block generated by the profile presenter (125), the profile builder (119) identifies the changes as the preferences and stores the preferences for subsequent generations of signature blocks for the same recipient or the same set of recipients.

In one embodiment, the message composer (121) allows the sender to edit and format the signature block (312) within the message body (310). The message composer (121) could allow the user to format the block using typical text formatting functions, which could include moving text, justifying text, changing highlights, font size and color, or any other text formatting function known in the art. The message composer (121) could further allow users to edit the text within the signature block (312). Such editing functions could include the addition or deletion of static text. For example, in the illustration in FIG. 8, in the customized message (318) the text "Hi" could represent static text that could be changed, without changing the meaning of the message to, for example "Greetings".

In one embodiment, the message composer (121) could further allow the user to insert dynamic fields into the signature block that draw data from user profiles maintained on the user terminal (101). For example, in the illustration in FIG. 8, the user name, email address and telephone number fields could draw their data from the sender's profile maintained on the user terminal (101), and the email counts and rank fields may draw their data from the recipient's profile in the profile set (113) maintained on the user terminal (101). In one embodiment, upon the occurrence of a user interface action, such as a right mouse click or a sequence of control keys, the profile presenter (125) could display a list of profile fields available for the sender and/or the recipient, which the sender could then select for insertion into the signature block.

In one embodiment, the message composer (121) could further allow the user to insert dynamic fields into the signature block that draw data from sources external to the user terminal (101), such as external websites. For example, the fields containing social network statistics could draw data directly from the user's social network account in real-time. Such data could be obtained from the website using any technique known in the field, such as through fields defined to a custom API provided by the website, or could be obtained by mapping data fields on a specific webpage. In one embodiment, upon the occurrence of a user interface action, such as a right mouse click or a sequence of control keys, a list of data fields from known external sources available for the sender and/or the recipient could be displayed, which the sender could then select for insertion into the signature block. Additionally or alternatively, a dialogue could be displayed to allow the sender to define a data field on an external data source, e.g. a field on a webpage of an external website.

In one embodiment, when a signature block (318) has been customized, the message composer could allow the signature block to be saved on the user terminal (101). In one embodiment, if the signature block (318) has been customized for a specific recipient, the customizations could be saved on the recipient's profile in the profile set (113). The customized signature block will then be used for all emails sent to that recipient in the future. If a signature block has been customized for the sender (e.g. for use in emails sent to a group), the customizations could be saved on the sender's profile. Alternatively, signature block customizations could be stored in a separate data store on the user terminal (101).

In one embodiment, automatic signature generation functions as described above are implemented as functions of a message composer (121). In one embodiment, automatic signature generation functions are provided by a separate automatic signature generation module integrated with the message composer (121). In one embodiment, an automatic signature generation module could be implemented as an add-on module for an existing communications client, such as Microsoft Outlook, that can automatically generate signature blocks based on complete addresses entered into the "To" field of emails, and insert the blocks into the body of the email. In one embodiment, alternatively or additionally, a separate signature block editor could be provided, wherein a user could compose signature blocks for senders and recipients entirely independent of the message composer (121).

Figure 10:
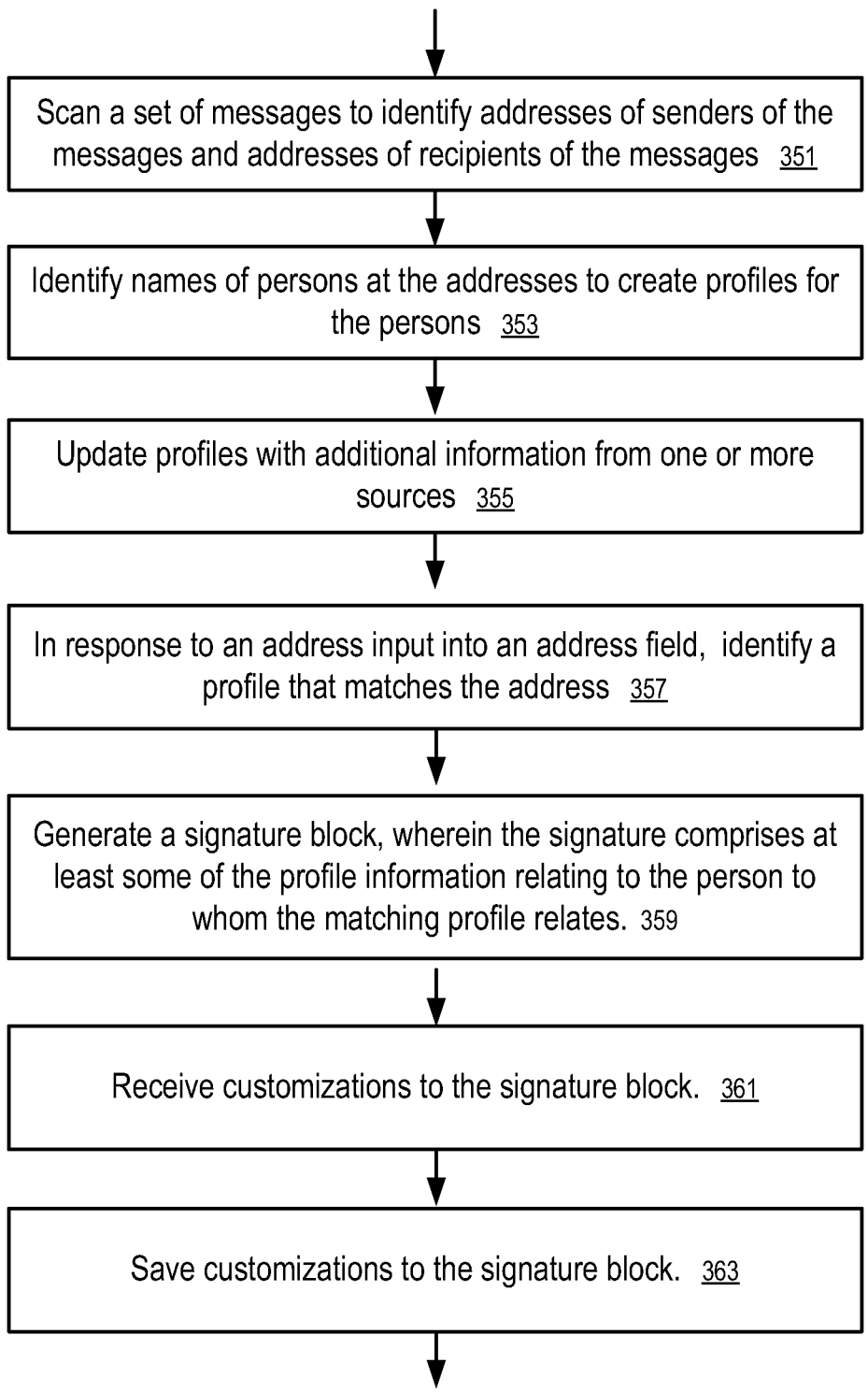
FIG. 10 shows a method to automatically generate a signature block according to one embodiment.

FIG. 10 shows a method to select automatically generate signature blocks according to one embodiment.

Information is stored about a plurality of persons. In one embodiment, the profile builder (119) scans (351) a set of messages (115 and 117) to identify addresses of senders of the messages and addresses of recipients of the messages in an automatic way, for example, when the profile builder (119) is installed and/or when the messages (115 and 117) are received or sent. The profile builder (119) then identifies (353) names of persons at the addresses, generates profiles for the persons at the addresses, and stores them in the profile set (113).

In one embodiment, the profile builder (119) updates (355) profiles in the profile set (113) with additional profile information relating to the persons to whom the profiles relate. The additional profile information can be collected from one or more sources. Such sources could be local to the user terminal (101). In one embodiment, the additional profile information includes email statistics, which can include, for example, the number of emails sent to and received from persons via the user terminal (101). Additional profile information could also be collected from one or more sources external to the user terminal. Such sources could include external websites containing data relating to persons to whom the profiles relate, such as, for example, social networking sites.

In response to an input in an address field of a user interface used to compose a message, an automatically generated signature block is then applied to the message in the user interface based on one or more addresses in the address field and at least a portion of the stored information. In one embodiment, where a single address is entered into the address field, a profile in the profile set (113) that matches the address is identified (357). A signature block is then generated (359) by the message composer (121), wherein the signature block comprises at least some of the profile information relating to the person in the profile that matches the address. In one embodiment, where multiple addresses are entered, a profile for the message sender is identified and a signature is then generated by the message composer (121), wherein the signature comprises at least some of the profile information relating to the message sender.

In various embodiments, the signature block may or may not include information about the message sender, information about the recipients of the message (as specified in the address field), and/or information about a relationship between the user and the recipients. It may be a blank signature block in some cases, based on the addresses found in the address field. In one embodiment, the content of the signature block is determined by preferences for the message sender and/or the message recipients stored on the user terminal (101). In one embodiment, the content of the signature block is determined by signature block customizations for the message sender and/or the message recipients stored on the user terminal (101).

In one embodiment, a user interface is provided to allow the message sender to customize (361) the generated signature block. The interface could be integral to the message composer (121) or could be a separate interface, e.g. a separate window that pops up when the signature is double-clicked. In one embodiment, the signature block could be customized to include any of the sender's profile fields, such as name, email address, mailing address and telephone number. In one embodiment, the signature block could be customized to include any of a recipient's profile fields, such as, for example, name and email statistics.

In one embodiment, customizations to signature blocks can be saved (363), such that the next time a signature block is generated for a specific recipient or a group of recipients, the customizations can be automatically applied to the generated signature block, for example, as in operation (359) above.

In the example above, information included in the signature block is locally present on the user terminal (101) (e.g. preferences, customizations and profile information). However, information contained on the signature block could be obtained from any source accessible to the user terminal, such as, for example, external websites. Furthermore, preferences, customizations and profile information could be stored remotely from the user terminal (101).

Figure 11:
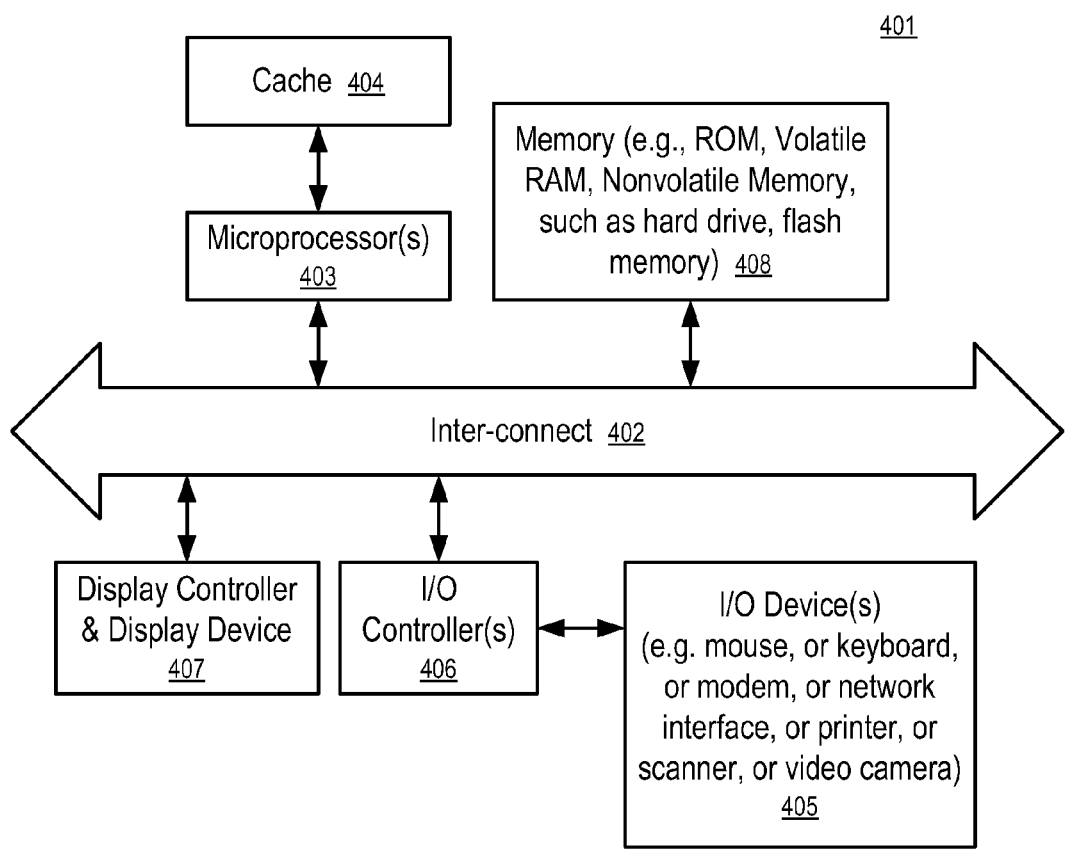
FIG. 11 shows a data processing system, which can be used in various embodiments.

FIG. 11 shows a data processing system, which can be used in various embodiments. While FIG. 11 illustrates various components of a computer system, it is not intended to represent any particular architecture or manner of interconnecting the components. Some embodiments may use other systems that have fewer or more components than those shown in FIG. 11.

In one embodiment, the user terminal (101) can be implemented as a data processing system, with fewer or more components, as illustrated in FIG. 11. When one or more components of the user terminal (101) are implemented on one or more remote servers, the servers can be implemented as a data processing system, with fewer or more components, as illustrated in FIG. 11.

In FIG. 11, the data processing system (401) includes an inter-connect (402) (e.g., bus and system core logic), which interconnects a microprocessor(s) (403) and memory (408). The microprocessor (403) is coupled to cache memory (404) in the example of FIG. 11.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

Figure 12:
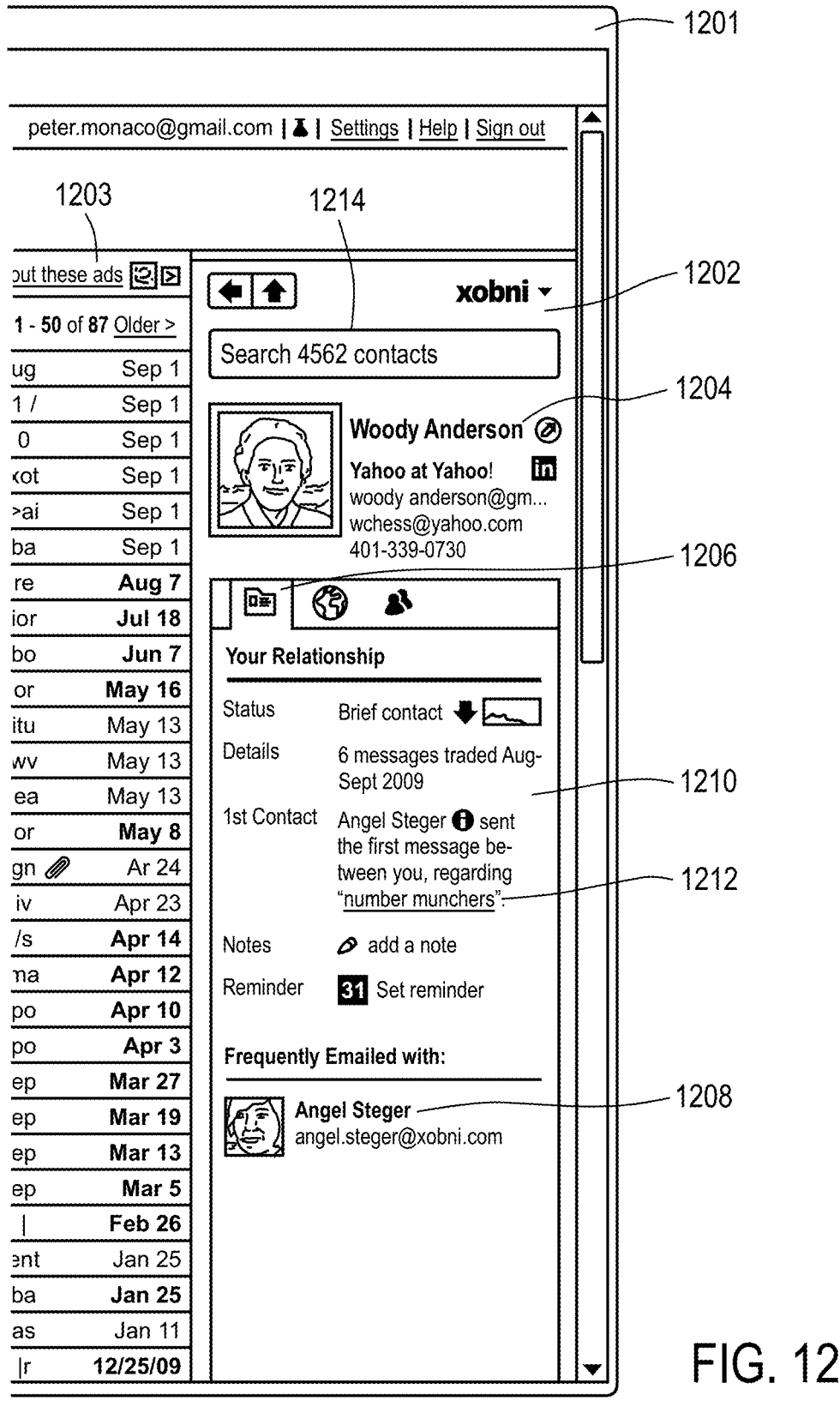
FIG. 12 shows a side bar in a communications user interface that presents information about a person including a relationship history between the person and the user, according to one embodiment.

FIG. 12 shows a side bar (1202) in a communications user interface (1201) that presents information about a person including a relationship history (1201) between the person and the user, according to one embodiment. In this embodiment, a set of messages to or from a user is scanned to generate a plurality of profiles for persons associated with the messages, each person being a sender or a recipient of at least one of the set of messages, and the persons including a first person. A relationship history is generated using the plurality of profiles, wherein the relationship history is for a relationship between the user and the first person. The relationship history is then presented to the user (e.g., on a display of the user terminal).

In some embodiments, the relationship history is presented as part of user interface (1201) in side bar (1202) along with a window (1203) for a user interface including access to an email client (e.g., Microsoft Outlook or a web-based interface such as for Google Gmail). Some examples of side bars that may be used in various embodiments are illustrated and/or described in U.S. Non-Provisional application Ser. No. 12/792,698, filed Jun. 2, 2010, entitled "SELF POPULATING ADDRESS BOOK," by Smith et al., which was incorporated by reference above.

In one embodiment, the relationship history comprises a name of a person first introducing the first person and the user. In one embodiment, the relationship history further comprises a count of the number of messages exchanged between the user and the first person. In other embodiments, this count could be based on appearances of the user and/or first person's name or address in the body of one or more messages.

In one embodiment, the relationship history comprises a date of first introduction, via one of the set of messages, of the first person and the user. In one embodiment, the relationship history comprises a subject or topic associated with the first person's relationship to the user.

In one embodiment, each profile of the plurality of profiles comprises a name of a respective person, and at least two addresses for the respective person. In one embodiment, the method further comprises computing scores of the persons using the plurality of profiles to determine relevancy of the persons to the user, the computing scores comprising determining a relevancy of the first person to the user. The presenting the relationship history may be based at least in part on the relevancy of the first person.

In an alternative embodiment, a method comprises: storing information, using a user terminal, relating to a plurality of persons in messages sent from or received by the user terminal; generating a relationship history, using the user terminal, based on at least a portion of the information relating to the plurality of persons; and presenting the relationship history in a user interface of the user terminal. The generating may be in response to an input to the user interface. The input may be made in an address field to compose a new message.

In one embodiment, the history of communications between the user and a contact (e.g., the first person, John), is reviewed to determine, for example, how many emails have been exchanged, and over what time range, and regarding subjects or topics. A text paragraph is generated that describes the relationship based on this review.

As an example, message composer (121) automatically generates and presents the following relationship history (here, a text paragraph) about the user's relationship (here, the user is Peter) with the first person (i.e., John):

You (Peter) and John (john@txroad.com) appeared together on 65 messages between July and October 2010. The first message was from eric@xobni.com to john@txroad.com on Jul. 1, 2010, regarding "August Foreign Filings".

The foregoing relationship history includes a count of the number of joint appearances of the user and the first person, and the date of first contact between the user and the first person. This history is generated based on information stored on the user terminal (e.g., in the plurality of profiles). In other embodiments, this information could be stored on other local computer devices, or could be accessed over the Internet from one or more servers.

Another example of a presentation of further information from a relationship history for the relationship between user Peter and first person John is as follows:

You (Peter) and Victor (victor@txroad.com) have traded 2 messages in October 2010. You may have been introduced by John (john@txroad.com) who sent the first message between you, regarding "Monitoring and Payment of Fees".

The foregoing message identifies the name and address of the person (John) that first introduced Victor to the user. The subject or topic is also presented (e.g., pulled from the subject line of the first message, or a topic determined from prior and/or subsequent messages associated with the first person). In this example, this is the first message to the user on which Victor's name appears. John is the sender of this message, which fact is used to identify John as the person first introducing Victor to the user.

Further specific exemplary information about relationship histories is now described in more detail. The presentation of a relationship history may assist the user in identifying a person (e.g., in the user's address book) that the user may not be familiar with due to the passage of a large time period since the last activity involving that person. The relationship history may be automatically generated by scanning a user's email data stored on the user terminal. In an alternative embodiment, the relationship history may be generated by scanning email data stored on a server.

The text paragraphs presented to the user may contain standardized text components that are re-used in many presentations along with various fields that are customized for the particular paragraph being presented for a given person. One field may be, for example, the name of the person making a first introduction or the date of first introduction. Other fields may be used for the various types of information discussed above.

In one embodiment, to determine the person who introduced the user and the first person, the sender is determined for the first email that both the user and the first person appeared on (e.g., Peter and Victor are both on the "To:" line of this first message, but either Peter or Victor could in other examples be on the Cc: or other lines of the message, or be on a list of recipients of other forms of messages). The sender John is here deemed to have introduced Peter and Victor because this is the earliest message the user has received that includes Victor's name or address. Various standard form paragraphs may be stored for use, with each form paragraph describing a different type of communication situation (e.g., "You were Cc'd on this email from _____").

In other embodiments, a topic associated with the first person may be provided in the text paragraph to the user. The topic may be determined from the subject line of the message making a first introduction. In one embodiment, a high-level, short list of topics may be identified using other emails from or associated with the first person. These topics also may be searchable by the user. In this case, the user has the ability to search relationship histories associated with persons in order to find, for example, the person that is associated with a particular subject or topic (e.g., fees or annuities), or to find a person that was introduced by a third person (e.g., the user can't remember Bob's name, but remembers that Jim introduced them).

Now discussing FIG. 12 in more detail, a screen shot is illustrated for one specific example of the presentation of relationship history information to the user. As mentioned above, user interface (1201) has side bar (1202) and a window (1203). Side bar (1202) presents information about a first person (1204) (Woody Anderson) including relationship history (1210) between first person (1204) and the user.

Other information about the relationship with first person (1204) may be accessed by a user by clicking on a tab (1206) This information may include a status (e.g., frequency of contact with the user) and other information regarding the relationship (e.g., category of relationship pattern, or a graphical illustration of prior communication frequency over time). A list of persons (e.g., person (1208) Angel Steger) that the user frequently includes on emails to the first person (1204) may be listed in side bar (1202) Relationship history (1210) may include an active link (1212) that when activated opens the actual message used to make the first introduction of the first person (1204) Search box (1214) may be used by the user to search for information in person profiles stored on the user terminal.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   generating, by at least one processor, a plurality of profiles for persons associated with messages to or from a user of a computing device, each person being a sender or a recipient of at least one of the messages, and the persons including a first person having a first profile;
   generating a relationship history comprising information regarding a history of communications between the user and the first person, and further comprising a name of a person first introducing the first person and the user;
   receiving an input provided by the user in a field of a user interface of a communications client executing on the computing device, the input made to compose a new message to the first person; and in response to receiving the input, automatically generating and inserting text in the new message, the generating comprising customizing the text based on a common domain of recipients of the new message, and further customizing, based on the relationship history, the text to include the name of the person first introducing the first person and the user, wherein the communications client allows the user to edit the inserted text.

2. The method of claim 1, wherein the field of the user interface is an address field.

3. The method of claim 1, wherein the first profile comprises a rank of the first person, and the customized text is based at least in part on the rank.

4. The method of claim 1, wherein the generating the plurality of profiles comprises scanning messages sent to the user.

5. A system, comprising:
a display;
a communications client to receive an input in a user interface presented via the display;
at least one processor; and
memory storing instructions configured to instruct the at least one processor to:
present the user interface on the display;
generate a plurality of profiles for persons associated with messages to a user, each person being a sender of at least one of the messages, and the persons including a first person having a first profile;
generate a relationship history using the plurality of profiles, the relationship history comprising a name of a third person first introducing the first person and the user;
receive an input in a field of the user interface, the input made to compose a new message to the first person; and
in response to receiving the input in the field, automatically insert text in the new message, the inserting comprising automatically customizing the text based on a common domain of recipients of the new message, and further customizing, based on the relationship history, the text to include the name of the third person.

6. The system of claim 5, wherein the communications client is configured to allow the user to edit the inserted text prior to sending the new message.

7. The system of claim 5, wherein the text is inserted in a body of the new message.

8. The system of claim 5, wherein the instructions are further configured to instruct the at least one processor to determine a topic from a subject line of a first message received by the user, wherein the customized text is based at least in part on the topic.

9. The system of claim 5, wherein the instructions are further configured to instruct the at least one processor to store a plurality of standardized text components, including a first component, and the text is further customized based on at least the first component.

10. A non-transitory computer-readable storage medium storing computer-readable instructions, which when executed, cause a computing apparatus to:
generate, by at least one processor, a plurality of profiles for persons associated with messages from a user of a computing device, each person being a recipient of at least one of the messages, and the persons including a first person having a first profile;
generate a relationship history comprising information regarding a history of communications between the user and the first person;
receive an input provided by the user via a user interface of a communications client executing on the computing device, the input made to compose a new message to the first person; and
in response to receiving the input, automatically generate text for inclusion in the new message, the generating comprising customizing the text based on a common domain of recipients of the new message, and further customizing, based on the relationship history, the text to include a name of a person first introducing the first person and the user, wherein the communications client allows the user to edit the inserted text.

11. The computer-readable storage medium of claim 10, wherein the input is provided in an address field.

12. The computer-readable storage medium of claim 10, wherein the first profile comprises a rank of the first person, and the customized text is based at least in part on the rank.

13. The computer-readable storage medium of claim 10, wherein the generating the plurality of profiles comprises scanning messages sent to the user.

14. The computer-readable storage medium of claim 10, wherein the text is inserted in a body of the new message.

* * * * *